United States Patent
Okabe et al.

(10) Patent No.: US 12,271,664 B2
(45) Date of Patent: Apr. 8, 2025

(54) SIMULATION METHOD OF A BATTERY USING MOLTEN SALT AS AN ELECTROLYTE, AND ASSOCIATED SIMULATION DEVICE

(71) Applicant: GS Yuasa International Ltd., Kyoto (JP)

(72) Inventors: Yosuke Okabe, Kyoto (JP); Hiroyuki Enomoto, Kyoto (JP); Shigeki Yamate, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 839 days.

(21) Appl. No.: 17/440,579

(22) PCT Filed: Mar. 18, 2020

(86) PCT No.: PCT/JP2020/012068
§ 371 (c)(1),
(2) Date: Sep. 17, 2021

(87) PCT Pub. No.: WO2020/189730
PCT Pub. Date: Sep. 24, 2020

(65) Prior Publication Data
US 2022/0188479 A1    Jun. 16, 2022

(30) Foreign Application Priority Data
Mar. 19, 2019    (JP) ................... 2019-051225

(51) Int. Cl.
*G06F 30/20*    (2020.01)
*H01M 6/36*    (2006.01)
(Continued)

(52) U.S. Cl.
CPC .............. *G06F 30/20* (2020.01); *H01M 6/36* (2013.01); *H01M 6/50* (2013.01); *G06F 2111/10* (2020.01); *G06F 2119/08* (2020.01)

(58) Field of Classification Search
CPC .. G06F 30/20; G06F 2119/08; G06F 2111/10; G06F 30/25; G06F 30/27;
(Continued)

(56) References Cited

U.S. PATENT DOCUMENTS 5,428,560 A    6/1995    Leon et al.
6,542,784 B1    4/2003    Amaya et al.
(Continued)

FOREIGN PATENT DOCUMENTS

JP    H11-014507 A    1/1999
JP    2001-152397 A    6/2001
(Continued)

OTHER PUBLICATIONS

S. Fujiwara, M. Inaba, A. Tasaka, "New molten salt systems for high-temperature molten salt batteries: LiF—LiCl—LiBr-based quaternary systems" pp. 7691-7700, (Year: 2010).*
(Continued)

*Primary Examiner* — Kibrom K Gebresilassie
(74) *Attorney, Agent, or Firm* — Alston & Bird LLP

(57) ABSTRACT

The present invention provides a simulation method, a simulation device, and a simulation program. A method for simulating a cell in which the electrolyte is a molten salt, the simulation method involving simulating the behavior of the cell and including a process for raising the temperature of the molten salt.

16 Claims, 12 Drawing Sheets

(51) Int. Cl.
  *H01M 6/50* (2006.01)
  *G06F 111/10* (2020.01)
  *G06F 119/08* (2020.01)

(58) Field of Classification Search
  CPC ...... G06F 30/28; G06F 2111/00; G06F 30/02; G06F 2119/22; H01M 6/36; H01M 6/50
  See application file for complete search history.

(56) References Cited

U.S. PATENT DOCUMENTS

| 2016/0290943 | A1 | 10/2016 | Sakashita et al. | |
|---|---|---|---|---|
| 2017/0084969 | A1* | 3/2017 | Choi ........................ | B60L 3/12 |
| 2020/0210541 | A1* | 7/2020 | Han .................. | H01M 10/4207 |

FOREIGN PATENT DOCUMENTS

| JP | 2001-179336 A | 7/2001 |
|---|---|---|
| JP | 2004-220600 A | 8/2004 |
| JP | 2006-010648 A | 1/2006 |
| JP | 2009-106059 A | 5/2009 |
| JP | 2010015890 A | 1/2010 |
| JP | 2010-272239 A | 12/2010 |
| JP | 2012-069496 A | 4/2012 |
| JP | 2012-154665 A | 8/2012 |
| JP | 2012-174570 A | 9/2012 |
| JP | 2013-089549 A | 5/2013 |
| JP | 2013-101884 A | 5/2013 |
| JP | 2015-050062 A | 3/2015 |
| JP | 2016-090399 A | 5/2016 |
| JP | 2016-194919 A | 11/2016 |
| JP | 2017-059343 A | 3/2017 |
| JP | 2017-139857 A | 8/2017 |

OTHER PUBLICATIONS

N. Haimovich, D. R. Dekel, S. Brandon, "A Simulator for System-Level Analysis of Heat Transfer and phase change in thermal Batteries" pp. A350-A362 (Year: 2015).*
B. O. Peirce, "On a New Method of Comparing the Electromotive Forces of Two Batteries and Measuring Thier Internal REsistance" pp. 137-140, (Year: 1877).*
International Searching Authority, International Search Report and Written Opinion for International Application No. PCT/JP2020/012068, dated Jun. 16, 2020, (13 pages), Japan Patent Office, Tokyo, Japan.
Guo, Meng et al. *Single-Particle Model For A Lithium-Ion Cell: Thermal Behavior*, Journal Of The Electrochemical Society, vol. 158, No. 2, pp. A122- A132, Dec. 15, 2010, DOI: 10.1149/1.3521314.
Kim, Ui Seong et al. *Modeling the Dependence of the Discharge Behavior of a Lithium-Ion Battery on the Environmental Temperature*, Journal of The Electrochemical Society, vol. 158, No. 5, pp. A611-A618, Mar. 28, 2011, DOI: 10.1149/1.3565179.
Roberts, Scott A. *Multiphysics Modeling of Thermal Batteries*, Sandia National Laboratires, (24 pages), Dec. 7, 2016.
Chiu, Kuan-Cheng et al. "An Electrochemical Modeling of Lithium-ion Battery Nail Penetration," *Journal of Power Sources*, vol. 251, Dec. 1, 2013, pp. 254-263, XP028807492. ISSN: 0378-7753, DOI: 10.1016/j.jpowsour.2013.11.069.
Dai, Haifeng et al. "Adaptive Kalman Filtering Based Internal Temperature Estimation With An Equivalent Electrical Network Thermal Model For Hard-Cased Batteries," *Journal of Power Sources*, vol. 293, Oct. 20, 2015, pp. 351-365, DOI: 10.1016/j.jpowsour.2015.05.087.
Extended European Search Report for European Patent Application No. 20773733.9, dated May 2, 2022, (15 pages), European Patent Office, Munich, Germany.
Extended European Search Report for European Patent Application No. 20772540.9, dated Apr. 7, 2022, (8 pages), European Patent Office, Munich, Germany.
International Searching Authority, International Search Report and Written Opinion for International Application No. PCT/JP2020/003127, dated Mar. 3, 2020, (12 pages), Japan Patent Office, Tokyo, Japan.
Kelley, Douglas H. "Fluid Mechanics of Liquid Metal Batteries," arXiv Preprint arXiv: 1710.03150v1 [physics.flu-dyn] Oct. 9, 2017, (31 pages), XP080827265, available online <URL: https://arxiv.org/abs/1710.03150>.
Lin, Xinfan et al. "A Lumped-Parameter Electro-Thermal Model For Cylindrical Batteries," *Journal of Power Sources*, vol. 257, Jan. 31, 2014, pp. 1-11, XP028636585, ISSN: 0378-7753, DOI: 10.1016/j.jposour.2014.01.097.
Ning, Gang et al. "Cycle Life Modeling Of Lithium-Ion Batteries," *Journal Of The Electrochemical Society*, vol. 151, No. 10, pp. A1584-A1591, Sep. 21, 2004.
Roberts, Christine C. et al. "Molten Salt Batteries: Mechanics and Electrolyte Transport 670g—Introduction to Thermal Batteries," *Aiche Annual Conference, Lithium and Beyond, Fundamental Advances In High Performance Batteries 1*, Sandia National Laboratories (SAND2017-11696C), Nov. 2, 2017, (21 pages), XP055905243, Albuquerque, New Mexico, US, available online <URL: https://www.osti.gov/servlets/purl/1480588>.
Shen, Yuxin et al. "Thermal Convection In A Liquid Metal Battery," *Theoretical and Computational Fluid Dynamics*, vol. 30, No. 4, pp. 275-294, (Dec. 11, 2015, XP036006355, ISSN: 0935-4964, DOI: 10.1007/S00162-015-0378-1.
Trembacki, Bradley L. et al. "Uncertainty Quantification Verification and Validation of a Thermal Simulation Tool for Molten Salt Batteries," *47th Power Sources Conference*, Sandia National Laboratories (SAND2016-5705C), Jun. 15, 2016, (14 pages), XP055905271, Albuquerque, New Mexico, US, available online <URL: https://www.osti.gov/servlets/purl/1368656>.
Voskuilen, Tyler G. et al. "Multi-Physics Multi-Plateau Reaction Model For LiSi/FeS2 Batteries," *Power Sources Conference*, Sandia National Laboratories (SAND2016-3229C), Apr. 1, 2016, XP055905364, (4 pages), available online <URL: https://www.osti.gov/servlets/purl/1581535>.
Zhao, Rui et al. "A Comprehensive Study On Li-ion Battery Nail Penetrations and the Possible Solutions," *Energy*, vol. 123, Feb. 4, 2017, pp. 392-401, XP029952540, ISSN: 0360-5442, DOI: 10.1016/j.energy.2017.02.017.
Non-Final Office Action for United States U.S. Appl. No. 17/440,113, dated Feb. 13, 2025, (36 pages).
Zavalis, et al., "Investigation of Short-Circuit Scenarios in a Lithium-Ion Battery Cell", Journal of the Electrochemical Society, vol. 159, Apr. 16, 2012, (13 pages).
Lee, et al., "Failure Analysis of Short-Cicuited Lithium-Ion Battery with Nickel-Manganese-Cobalt/Graphite Electrode", *Journal of Nanoscience and Nanotechnology, American Scientific Publishers*, vol. 18, pp. 6427-6430, (2018).
Rashid, et al., "Mathematical Model for Combined Effect of SEI Formation and Gas Evolution in Li-Batteries", *ECS Electrochemistry Letters*, vol. 3:10, Aug. 6, 2014, (5 pages).

* cited by examiner

Fig. 3

| Battery ID | User ID | Positive electrode | | | | Negative electrode | | | |
| --- | --- | --- | --- | --- | --- | --- | --- | --- | --- |
| | | Active material | Thickness | Diameter | OCP | Active material | Thickness | Diameter | OCP |
| c001 | u001 | Iron disulfide | Zp | Dp | ☑ | Lithium silicon | Zn | Dn | ☑ |
| .... | .... | .... | .... | .... | .... | .... | .... | .... | .... |

| Temporal transition | Region 10A | Region 10B | Region 10C | Region 10D | Region 10E |
|---|---|---|---|---|---|
| 0~0.03sec | | | | | |
| 0.03~0.05sec | ▨ | | | | |
| 0.05~0.07sec | ▨ | ▨ | | | |
| 0.07~0.09sec | ▨ Heat generation density H1 | ▨ | ▨ | | |
| 0.09~0.11sec | ▨ | ▨ Heat generation density H2 | ▨ | ▨ | |
| 0.11~0.31sec | ▨ | ▨ | ▨ Heat generation density H3 | ▨ | ▨ |
| 0.31~0.33sec | | ▨ | ▨ | ▨ Heat generation density H4 | ▨ |
| 0.33~0.35sec | | | ▨ | ▨ | ▨ Heat generation density H5 |
| 0.35~0.37sec | | | | ▨ | ▨ |
| 0.37~0.39sec | | | | | ▨ |

SIMULATION METHOD OF A BATTERY USING MOLTEN SALT AS AN ELECTROLYTE, AND ASSOCIATED SIMULATION DEVICE

CROSS REFERENCE TO RELATED APPLICATIONS

This application is a national stage application, filed under 35 U.S.C. § 371, of International Application No. PCT/JP2020/012068, filed Mar. 18, 2020, which international application claims priority to and the benefit of Japanese Application No. 2019-051225, filed Mar. 19, 2019; the contents of both of which as are hereby incorporated by reference in their entireties.

BACKGROUND

Technical Field

The present invention relates to a simulation method, a simulation device, and a simulation program.

Description of Related Art

As one type of battery, a thermal battery using molten salt as an electrolyte is known (see, for example, JP-A-2001-179336). The thermal battery is a storage type primary battery, and the molten salt is solid at the time of manufacturing or storage. In the molten salt, the battery reaction does not proceed unless the electrolyte is melted. For this reason, the thermal battery can exhibit a same battery characteristic as that immediately after the manufacture even in a case where a period of five to ten years or more elapses. In contrast, the electrolyte of the thermal battery is brought into a molten state by being heated to a high temperature, and exhibits excellent ion conductivity. The thermal battery can be activated at a high temperature to supply electricity to the outside. For this reason, there is a close relationship between temperature distribution and a current-voltage characteristic, and it is very important to grasp the temperature distribution in the design and quality control of the thermal battery. Since performance confirmation of each product cannot be performed in advance due to a characteristic of a product that starts to be used by being heated to a high temperature, design and quality control using simulation are particularly important.

BRIEF SUMMARY

In the development of such a thermal battery, it is important to simulate behavior related to temperature, current, and voltage of the thermal battery. In particular, it is very difficult to measure a temperature inside the battery with a sensor, and it is essential to use simulation. However, there is no case where the behavior of the thermal battery is simulated in consideration of various reactions including an exothermic reaction for increasing a temperature of the molten salt.

The present invention has been made in view of such circumstances, and an object of the present invention is to provide a simulation method, a simulation device, and a simulation program for simulating behavior of a thermal battery in consideration of various reactions including an exothermic reaction.

A simulation method is a method for simulating a battery using molten salt as an electrolyte, and simulates behavior of the battery including a process of increasing a temperature of the molten salt.

A simulation device includes a simulation execution unit that simulates behavior of a battery using molten salt as an electrolyte, the behavior including a process of increasing a temperature of the molten salt, and an output unit that outputs a simulation result by the simulation execution unit.

The simulation program is a computer program for causing a computer to execute processing for simulating behavior of a battery using molten salt as an electrolyte, the behavior including a process of increasing a temperature of the molten salt.

According to the above configuration, behavior of a thermal battery can be simulated in consideration of various reactions including an exothermic reaction.

BRIEF DESCRIPTION OF THE FIGURES

According to the accompanying figures:

FIG. 3 is a conceptual diagram illustrating an example of a battery table.

DETAILED DESCRIPTION OF VARIOUS EMBODIMENTS

Figure 1:
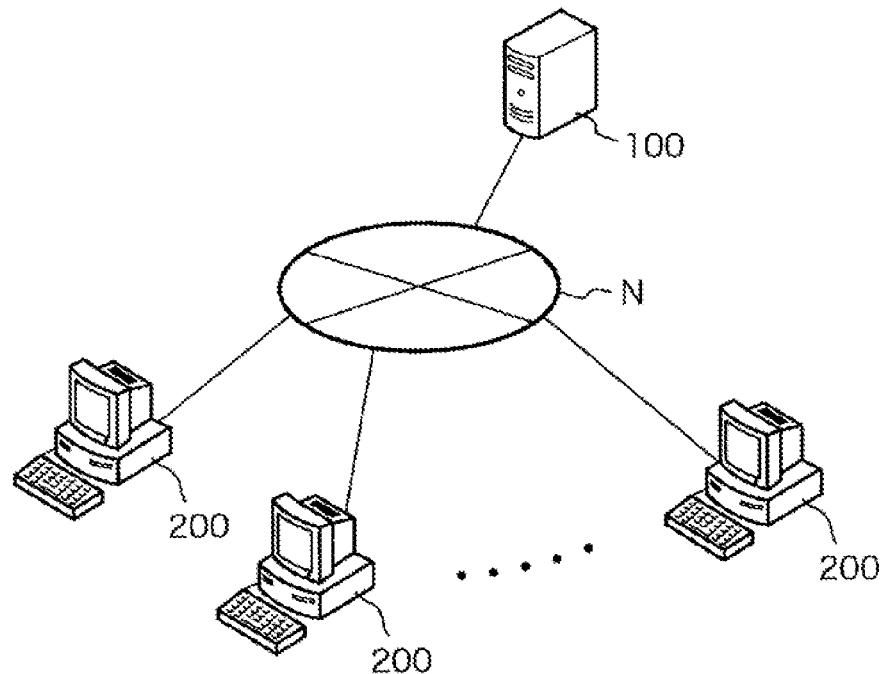
FIG. 1 is a schematic diagram describing an overall configuration of a simulation system according to the present embodiment.

A simulation method is a method for simulating a battery using molten salt as an electrolyte, and simulates behavior of the battery including a process of increasing a temperature of the molten salt.

According to this configuration, it is possible to simulate behavior of a battery including a process of increasing a temperature of the molten salt.

Ionic conductivity of the molten salt is a function of a temperature, and the ionic conductivity may indicate a value of insulation at a temperature equal to or lower than a first threshold temperature and may indicate a value of conductivity at a temperature equal to or higher than a second threshold temperature. According to this configuration, behavior can be estimated for a battery having molten salt in which ionic conductivity is a function of temperature, a value of insulation is indicated at a temperature equal to or lower than the first threshold temperature, and a value of conductivity at a temperature equal to or higher than the second threshold temperature.

The behavior of the battery may be simulated based on an exothermic reaction for increasing the temperature of the molten salt. According to this configuration, since the behavior of the battery is simulated based on the exothermic reaction for increasing the temperature of the molten salt, the behavior of the battery can be simulated by accurately reflecting a phenomenon occurring inside the battery. For example, the present simulation method can calculate a temporal change in resistance, current, terminal voltage, and the like inside the battery reflecting a temporal transition of an exothermic reaction and Joule heating, and current density distribution, potential distribution, and temperature distribution inside the battery.

The behavior of the battery may be simulated by coupled analysis of the exothermic reaction and Joule heating. Coupling means associating a plurality of physical phenomena with each other. For example, Joule heating is a coupled phenomenon of heat transfer and current. Since the exothermic reaction and Joule heating of the battery are not independent physical phenomena, and proceed while being correlated with each other through physical phenomena such as heat transfer, it is possible to simulate the behavior of the battery by accurately reflecting a phenomenon occurring inside the battery by performing coupled analysis.

The battery may include a heat generation source, a heat generation body that starts to generate heat by combustion of the heat generation source, and a power generation cell formed by laminating a positive electrode layer, an electrolyte layer, and a negative electrode layer, and the battery may be a bipolar type thermal battery in which the heat generation body and the power generation cell are laminated along a laminating direction of the positive electrode layer, the electrolyte layer, and the negative electrode layer. In the present specification, a bipolar battery refers to a battery in which a plurality of electrodes configured in a housing are electrically connected in series. According to this configuration, the bipolar type thermal battery in which the heat generation body and the power generation cell are laminated can be a simulation target.

The simulation method may calculate a calorific value in the exothermic reaction based on a packing amount and a temperature of the heat generation source. According to this configuration, in the present simulation method, for example, the calorific value in the exothermic reaction can be calculated using the Arrhenius reaction formula.

The heat transfer may be calculated using an equivalent physical property value calculated from a physical property value of each layer. Here, each layer is made from a composite material such as a positive electrode, an electrolyte, a negative electrode, and a heat generation body. According to this configuration, it is not necessary to calculate a physical property value such as thermal conductivity for each layer, so that the number of calculation elements can be reduced and calculation load can be reduced.

The simulation method may provide heat generation density in the exothermic reaction as a function of position and time. According to this configuration, the present simulation method can reduce calculation load by using a value of heat generation density obtained as an experimental result or another simulation result.

The simulation method may calculate current distribution of each layer using a selected part of layers as a representative layer. According to this configuration, in the present simulation method, the current distribution is calculated using the selected part of layers, so that the calculation load can be reduced.

The simulation method may calculate current distribution of each layer using only current density in the laminating direction. According to this configuration, the present simulation method can reduce the number of dimensions in current calculation, and thus can reduce the calculation load.

The current distribution of each layer may be calculated using an element mesh-divided in the laminating direction and an intersecting direction intersecting the laminating direction. According to this configuration, for example, the calculation can be stabilized by using orthogonal mesh.

The simulation method may execute current calculation using a submodel that repeats a procedure of calculating an electromotive force of the battery, a procedure of calculating internal resistance of the battery, and a procedure of calculating a current value in a next calculation step based on external load resistance of the battery and calculated values of the electromotive force and the internal resistance. According to this configuration, the present simulation method can determine a current boundary condition using the submodel.

The simulation device includes a simulation execution unit that simulates behavior of the battery including a process of increasing a temperature of the molten salt, and an output unit that outputs a simulation result by the simulation execution unit.

According to this configuration, the present simulation device can simulate behavior of a battery including a process of increasing a temperature of the molten salt. For example, the present simulation device can calculate a temporal change in resistance, current, terminal voltage, and the like inside the battery reflecting a temporal transition of an exothermic reaction and Joule heating, and current density distribution, potential distribution, and temperature distribution inside the battery.

The simulation execution unit may simulate at least one of an electric circuit and a thermal circuit connected to the battery. According to this configuration, it is possible to simulate the entire electric circuit or thermal circuit including a battery using molten salt as an electrolyte.

The simulation execution unit may generate at least two graphs of a temporal change of temperature distribution, voltage distribution, current density distribution, a current value, and voltage between terminals, and the output unit may output data of the graph to a display device so as to display the generated two graphs on the same screen. According to this configuration, each physical quantity in the battery can be intuitively grasped, and information that facilitates understanding of a complicated relationship between these physical quantities can be provided.

The simulation program is a computer program for causing a computer to execute processing for simulating behavior of a battery using molten salt as an electrolyte, the behavior including a process of increasing a temperature of the molten salt.

According to this configuration, the computer program can simulate behavior of the battery including a process of increasing the temperature of a molten salt. For example, the present computer program can calculate a temporal change in resistance, current, terminal voltage, and the like inside the battery reflecting a temporal transition of an exothermic reaction and Joule heating, and current density distribution, potential distribution, and temperature distribution inside the battery. In addition to these types of heat generation, reaction heat due to an electrochemical reaction can also be taken into consideration, and in that case, a more detailed simulation can be performed. Furthermore, "heat absorption by latent heat of fusion" or "heat absorption and generation by entropy" may be considered.

At least one of an electric circuit and a thermal circuit connected to the battery may be simulated. According to this configuration, it is possible to simulate the entire electric circuit or thermal circuit including a battery using molten salt as an electrolyte.

At least two graphs of a temporal change of temperature distribution, voltage distribution, current density distribution, a current value, and voltage between terminals may be generated, and data of the graph may be output to a display device so that the generated two graphs are displayed on the same screen. According to this configuration, each physical quantity in the battery can be intuitively grasped, and information that facilitates understanding of a complicated relationship between these physical quantities can be provided.

Hereinafter, the present invention will be specifically described with reference to the drawings illustrating an embodiment of the present invention.

First Embodiment

FIG. 1 is a schematic diagram describing an overall configuration of a simulation system according to the present embodiment. The simulation system according to the present embodiment includes a server device 100 and client devices 200, 200, ..., and 200 communicably connected to each other via a communication network N. In response to a request from the client device 200, the server device 100 simulates behavior of a thermal battery 10 (see FIG. 5) and provides a simulation result to the client device 200.

The client device 200 is a terminal device such as a personal computer, a smartphone, or a tablet terminal used by the user. It is assumed that software (application program) for accessing the server device 100 is installed in the client device 200. The server device 100 may perform, for example, user authentication based on a user ID and a password when receiving an access from the client device 200, and provide an appropriate service to the client device 200 in a case where the user authentication is successful.

The server device 100 according to the present embodiment transmits, to the client device 200, an interface screen for receiving various inputs by the user of the client device 200. The interface screen includes, for example, a reception screen for receiving a simulation condition. The server device 100 transmits a simulation result executed on the basis of the received condition to the client device 200.

The simulation result transmitted from the server device 100 to the client device 200 includes data such as numerical data and a graph obtained as an execution result of a simulation. The simulation result transmitted from the server device 100 to the client device 200 may include a mathematical model or a simulation program obtained as an execution result of a simulation.

In the present embodiment, a simulation condition is received in the client device 200, and the received simulation condition and the like are transmitted to the server device 100 so that simulation is executed. Alternatively, the server device 100 may receive a simulation condition, execute a simulation on the basis of the received simulation condition or the like, and display a simulation result on the server device 100.

Figure 2:
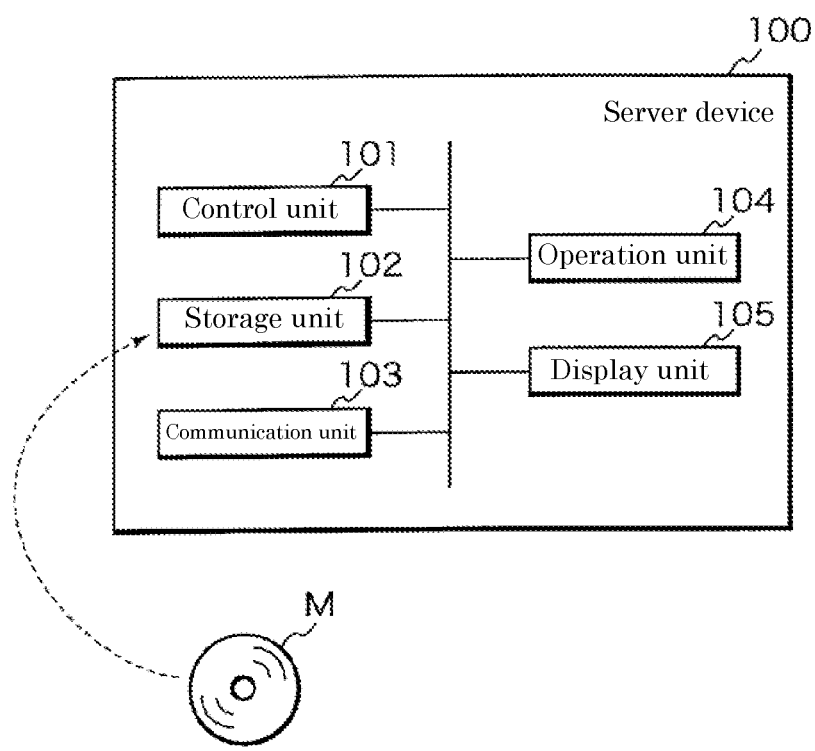
FIG. 2 is a block diagram describing an internal configuration of a server device.

FIG. 2 is a block diagram describing an internal configuration of the server device 100. The server device 100 includes a control unit 101, a storage unit 102, a communication unit 103, an operation unit 104, and a display unit 105.

The control unit 101 includes a central processing unit (CPU), a read only memory (ROM), a random access memory (RAM), and the like. The CPU included in the control unit 101 loads various computer programs stored in the ROM or the storage unit 102 into the RAM and executes the programs so as to cause the entire device to function as the simulation device of the present application by. The server device 100 is merely an embodiment of the simulation device, and may be any information processing device communicably connected to the client device 200.

The control unit 101 is not limited to the above configuration, and may be any processing circuit or arithmetic circuit including a plurality of CPUs, a multi-core CPU, a graphics processing unit (GPU), a microcomputer, a volatile or nonvolatile memory, and the like. The control unit 101 may have a function of a timer that measures elapsed time from when a measurement start instruction is given to when a measurement end instruction is given, a counter that counts the number, a clock that outputs date and time information, and the like.

The storage unit 102 includes a storage device using a hard disk drive (HDD), a solid state drive (SSD), or the like. The storage unit 102 stores various computer programs executed by the control unit 101, data necessary for executing the computer programs, and the like. The computer program stored in storage unit 102 includes a simulation program for simulating behavior of the thermal battery 10. The simulation program is, for example, execution binary. A theoretical formula on which the simulation program is based is described by an algebraic equation or a differential equation representing behavior of the thermal battery 10. The simulation program may be prepared for each piece of behavior of a simulation target, or may be prepared as one simulation program.

The simulation program may be described by commercially available numerical analysis software or programming language such as MATLAB (registered trademark), Amesim (registered trademark), Twin Builder (registered trademark), MATLAB & Simulink (registered trademark), Simplorer (registered trademark), ANSYS (registered trademark), Abaqus (registered trademark), Modelica (registered trademark), VHDL-AMS (registered trademark), C language, C++, or Java (registered trademark). The numerical analysis software may be a circuit simulator referred to as 1D-CAE, or may be a simulator of a finite element method, a finite volume method, or the like performed on a 3D shape. Alternatively, a reduced-order model (ROM) based on these may be used.

The program stored in the storage unit 102 may be provided by a non-transitory recording medium M in which the program is recorded in a readable manner. The recording medium M is, for example, a portable memory such as a CD-ROM, a universal serial bus (USB) memory, a secure digital (SD) card, a micro SD card, and a compact flash (registered trademark). In this case, the control unit 101 reads a program from the recording medium M using a reading device (not illustrated), and installs the read program in the storage unit 102. The program stored in the storage unit 102 may be provided by communication via the communication unit 103. In this case, the control unit 101 acquires the program through the communication unit 103 and installs the acquired program in the storage unit 102.

The storage unit 102 may store a mathematical model obtained as a result of simulation. The mathematical model is, for example, an execution code executed by a programming language or numerical analysis software. The mathematical model may be definition information or a library file referred to by a programming language or numerical analysis software.

Furthermore, the storage unit 102 may have a battery table in which information on the configuration of the thermal battery 10 is stored in association with a user ID. FIG. 3 is a conceptual diagram illustrating an example of the battery table. The battery table stores, for example, a battery ID for identifying the thermal battery 10, a user ID for identifying the user, and battery information in association with each other. The battery information registered in the battery table includes, for example, information on a positive electrode and a negative electrode, information on an electrolyte, and the like. The information on a positive electrode and a negative electrode is information of an active material name, thickness, a diameter, open circuit potential, a melting point, a heat resistant temperature, and the like of the positive electrode and the negative electrode. The information on an electrolyte is information of an ion species, a transport number, a diffusion coefficient, conductivity, and the like. From a characteristic of the thermal battery 10, it is desirable that conductivity of an ion be given as a function of a temperature. The battery table may include a link that refers to information of physical property, an operating state, a circuit configuration, and the like of the thermal battery 10. The information stored in the battery table may be registered by the administrator of the server device 100 or may be registered by the user via the client device 200. The information stored in the battery table may be used as a part of a simulation condition when behavior of a power storage device is simulated.

The communication unit 103 includes an interface for communicating with the client device 200 through the communication network N. In a case where information to be transmitted to the client device 200 is input from the control unit 101, the communication unit 103 transmits the input information to the client device 200 and outputs information from the client device 200 received through the communication network N to the control unit 101.

The operation unit 104 includes an input interface such as a keyboard and a mouse, and receives operation by the user. The display unit 105 includes a liquid crystal display device and the like, and displays information to be notified to the user. In the present embodiment, the server device 100 includes the operation unit 104 and the display unit 105. However, the operation unit 104 and the display unit 105 are not essential, and the configuration may be such that operation is received through a computer connected to the outside of the server device 100 and information to be notified is output to the external computer.

Figure 4:
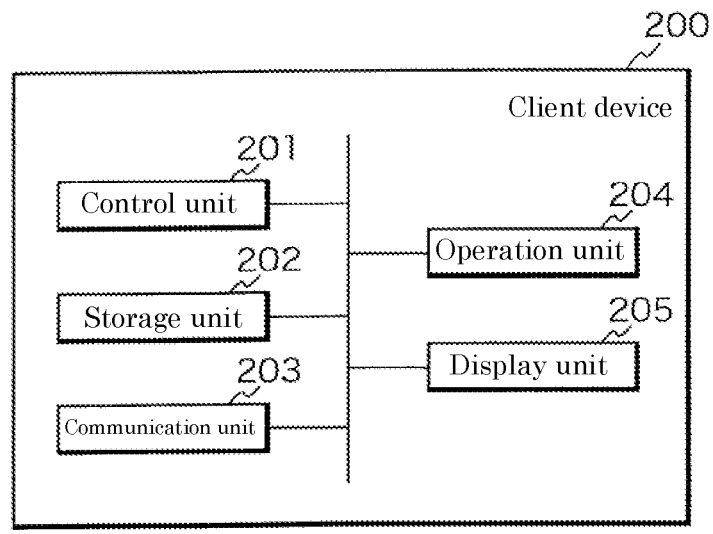
FIG. 4 is a block diagram describing an internal configuration of a client device.

FIG. 4 is a block diagram describing an internal configuration of the client device 200. The client device 200 is a personal computer, a smartphone, a tablet terminal, or the like, and includes a control unit 201, a storage unit 202, a communication unit 203, an operation unit 204, and a display unit 205.

The control unit 201 includes a CPU, a ROM, a RAM, and the like. The CPU included in the control unit 201 loads various computer programs stored in the ROM or the storage unit 202 into the RAM and executes control of the entire device.

The control unit 201 is not limited to the above configuration, and may be any processing circuit or arithmetic circuit including a plurality of CPUs, a multi-core CPU, a microcomputer, and the like. The control unit 201 may have a function of a timer that measures elapsed time from when a measurement start instruction is given to when a measurement end instruction is given, a counter that counts the number, a clock that outputs date and time information, and the like.

The storage unit 202 includes a nonvolatile memory such as an electronically erasable programmable read only memory (EEPROM), and stores various computer programs and data. The computer program stored in the storage unit 202 includes a general-purpose or dedicated application used for exchanging information with the server device 100. An example of the general-purpose application program is a web browser. In a case where a web browser is used to make an access to the server device 100, it is preferable to perform user authentication using a user ID and an authentication code, and communication between the server device 100 and the client device 200 is preferably permitted only in a case where the user authentication is successful.

The communication unit 203 includes an interface for communicating with the server device 100 through the communication network N. When information to be transmitted to the server device 100 is input from the control unit 201, the communication unit 203 transmits the input information to the server device 100 and outputs information from the server device 100 received through the communication network N to the control unit 201.

The operation unit 204 includes an input interface such as a keyboard, a mouse, and a touch panel, and receives operation by the user. The display unit 205 includes a liquid crystal display device and the like, and displays information to be notified to the user. In the present embodiment, the client device 200 includes the operation unit 204. However, the configuration may be such that an input interface such as a keyboard or a mouse is connected to the client device 200.

Hereinafter, a configuration of the thermal battery 10 as a simulation target will be described.

Figure 5:
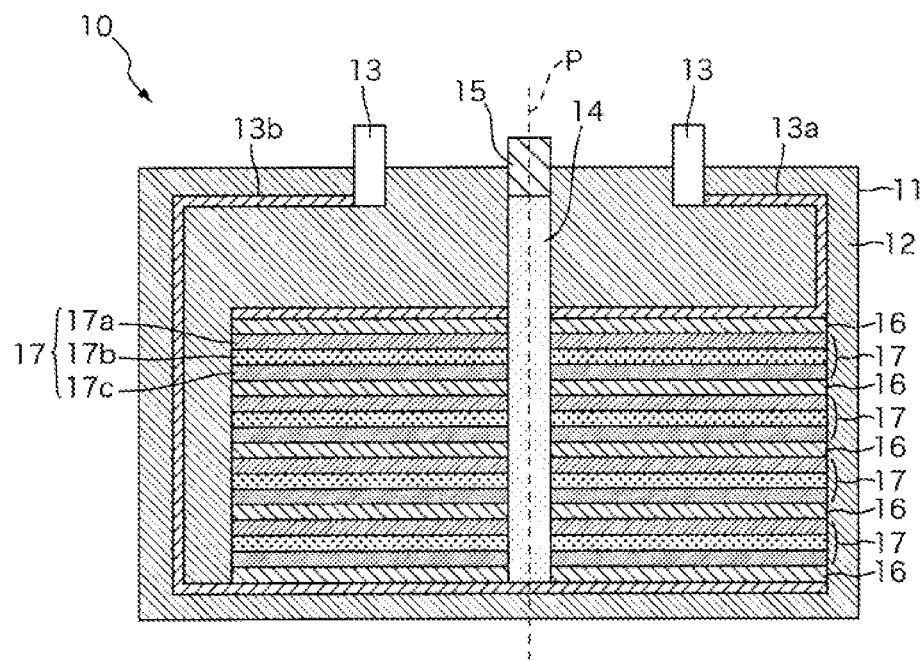
FIG. 5 is a longitudinal sectional view describing a configuration of a thermal battery.

FIG. 5 is a longitudinal sectional view describing a configuration of the thermal battery 10. The thermal battery 10 includes, for example, a housing 11, a heat insulating member 12, a pair of output terminals 13 and 13, a heat generation source 14, an ignition tool 15, a heat generation body 16, and a power generation cell 17.

The housing 11 is, for example, a cylindrical case, and houses the heat insulating member 12, the output terminal 13, the heat generation source 14, the ignition tool 15, the heat generation body 16, and the power generation cell 17. The heat insulating member 12 encloses the heat generation body 16 and the power generation cell 17. The heat insulating member 12 keeps the heat generation body 16 and the power generation cell 17 warm. The heat insulating member 12 can be made from a material having low thermal conductivity, high heat resistance, and electrical insulation, such as a ceramic fiber.

The output terminal 13 is a terminal for extracting current from the power generation cell 17 to the outside via connection members 13a and 13b. The connection member 13a is connected to a positive electrode layer 17a of the power generation cell 17 closest to the output terminal 13. The connection member 13b is connected to a negative electrode layer 17c of the power generation cell 17 farthest from the output terminal 13. With this connection, all the power generation cells 17 are electrically connected in series, and the whole battery becomes a bipolar battery. When current is supplied, the ignition tool 15 ignites the heat generation source 14 by emitting a spark. The heat generation source 14 is disposed along a central axis P of the housing 11. The heat generation source 14 includes a heat source such as gunpowder, and burns when ignited by the ignition tool 15.

The heat generation body 16 and the power generation cell 17 are both formed in a disk shape and laminated along the central axis P. The heat generation body 16 starts to generate heat from the central axis P side to the outer side by combustion of the heat generation source 14, and heats the power generation cell 17. The heat generation body 16 is made from, for example, a mixture of metal powder and an oxidizing agent.

The power generation cell 17 includes the positive electrode layer 17a, an electrolyte layer 17b, and the negative electrode layer 17c. The positive electrode layer 17a, the electrolyte layer 17b, and the negative electrode layer 17c are sequentially laminated along the central axis P. The positive electrode layer 17a is made from, for example, iron disulfide. The electrolyte layer 17b contains molten salt such as a eutectic mixture of lithium chloride and potassium chloride. The negative electrode layer 17c is made from, for example, lithium silicon.

In the example of FIG. 5, for simplification, the configuration of the thermal battery 10 in which four of the power generation cells 17 are laminated is shown. Alternatively, the number of the power generation cells 17 to be laminated can be optionally set according to specifications, an application, and the like, and for example, about fifty to one hundred of the power generation cells 17 may be laminated.

In FIG. 5, the heat generation source 14 is assumed to be disposed on the central axis P, and the heat generation body 16 is assumed to be disposed on a plane perpendicular to the central axis P. However, the present invention is not limited to such an arrangement as long as the molten salt of the electrolyte layer 17b can be appropriately melted. Furthermore, the mechanism of heat generation of the heat generation source 14 and the heat generation body 16 is not limited to reaction heat or combustion heat. For example, heater heating, frictional heat, temperature increase by adiabatic compression, microwave heating, arc heating, or the like may be used.

Figure 6:
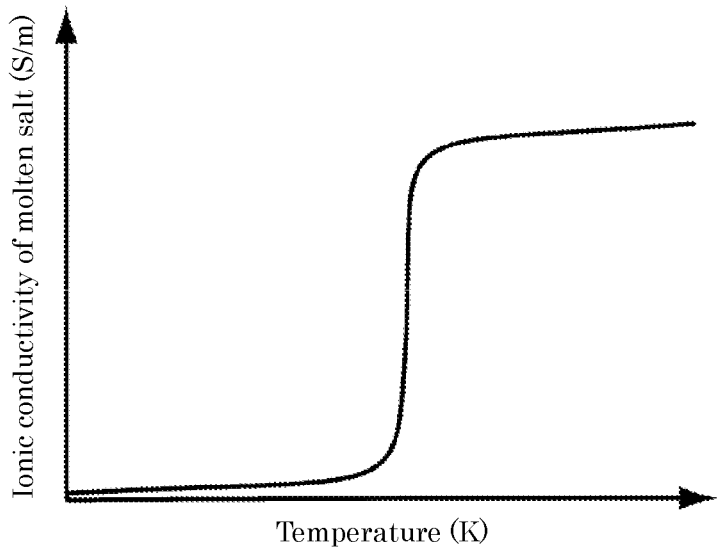
FIG. 6 is a graph showing temperature dependency of ionic conductivity of typical molten salt.

When the heat generation body 16 generates heat to a high temperature and the molten salt of the electrolyte layer 17b is melted, the ionic conductivity instantaneously becomes high, that is, the internal resistance instantaneously becomes lower, and power generation of the thermal battery 10 instantaneously starts. FIG. 6 is a graph showing temperature dependency of ionic conductivity of typical molten salt. The horizontal axis of the graph represents temperature, and the vertical axis represents ionic conductivity of the molten salt. As shown in the graph of FIG. 6, the ionic conductivity of the electrolyte layer 17b suddenly becomes high when the temperature exceeds a certain threshold. This threshold temperature is often near a melting point of the molten salt.

Hereinafter, a simulation method of the thermal battery 10 will be described.

Figure 7:
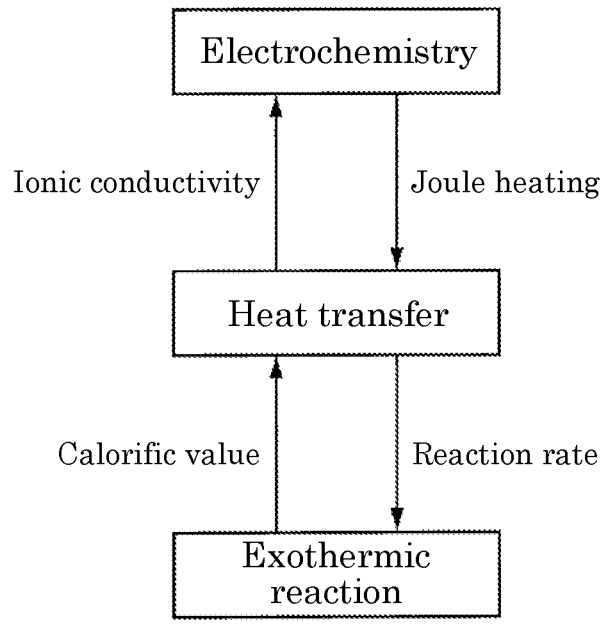
FIG. 7 is an explanatory diagram for describing an outline of a simulation method.

FIG. 7 is an explanatory diagram for describing an outline of the simulation method. The server device 100 according to the present embodiment simulates behavior of the thermal battery 10 based on the exothermic reaction for increasing the temperature of the molten salt of thermal battery 10 and Joule heating. Here, the exothermic reaction for increasing the temperature of the molten salt is a reaction accompanying ignition of the heat generation source 14 containing gunpowder, and a chain of heat generation from the heat generation source 14 to the heat generation body 16 can be expressed by, for example, the Arrhenius reaction formula below.

[Mathematical formula 1]
$$r = k_0 \exp\left(-\frac{E_a}{RT}\right)(1-x_f)^p (x_f + C_0)^q (1-x_f)$$
$$Q = \rho H_p r$$

Here, r is a reaction rate (1/s), $k_0$ is a reaction rate constant (1/s), $E_a$ is activation energy (J/mol), R is a gas constant (J/mol/K), T is a temperature (K), $x_f$ is a reaction rate, and p, q, and $C_0$ are constants. Q is heat generation density (W/m$^3$), ρ is density (kg/m$^3$), and $H_p$ is reaction latent heat (J/kg).

The Arrhenius reaction formula can express a difference in gunpowder combustion due to, for example, a configuration and arrangement of the heat insulating member 12. By using the Arrhenius reaction formula, the server device 100 can execute temperature simulation without assuming a calorific value at a specific time in consideration of packing density of the gunpowder, a kind of the gunpowder, a total packing amount, escape of heat to the surroundings, and the like. Different substances are usually used for the heat generation source 14 and the heat generation body 16, and a heat generation rate of the heat generation source 14 is often higher. For this reason, it is preferable to designate a reaction constant of each of the heat generation source 14 and the heat generation body 16. The Arrhenius reaction formula is given as an example of a reaction rate formula, and other reaction formulas may be used.

The server device 100 can use, for example, the Newman model for an electrochemical reaction. The Newman model is described by the Nernst-Planck equation, a charge conservation equation, the diffusion equation, the Butler-Volmer equation, and the Nernst equation described below.

The Nernst-Planck equation is an equation for solving ionophoresis and ion diffusion in an electrolyte solution or a porous electrode, and is expressed by the following equation:

[Mathematical formula 2]
$$i_l = -\sigma_{l,eff} \nabla \phi_l + \frac{\sigma_{l,eff} RT}{F}\left(1 + \frac{\partial \ln f}{\partial \ln c_l}\right)(1-t_+)\nabla \ln c_l$$
$$\nabla \cdot i_l = i_{tot}$$

Here, $\sigma_{l,eff}$ is liquid phase conductivity (S/m), $\Phi_l$ is liquid phase potential (V), R is a gas constant (J/(K·mol)), T is a temperature (K), F is the Faraday constant (C/mol), f is an activity coefficient, $c_l$ is ion concentration of the electrolyte (mol/m$^3$), $t_+$ is a cation transport number, and $i_{tot}$ is reaction current density per volume. The liquid phase effective conductivity $\sigma_{l,eff}$ is apparent conductivity in a porous body, and is often expressed by a function of conductivity of liquid phase bulk and a solid phase volume ratio $\varepsilon_s$. The liquid phase refers to an ion conducting portion, and refers to a molten salt portion in the thermal battery 10.

The charge conservation equation is an equation representing electron conduction in a porous electrode or a current collector, and is expressed by the following formula:

$$i_s = -\sigma_s \nabla \phi_s$$

$$\nabla \cdot i_s = -i_{tot} \quad \text{[Mathematical formula 3]}$$

Here, $\Phi_s$ is solid phase potential (V), $\sigma_s$ is solid phase conductivity (S/m), and $i_{tot}$ is a reaction current density (A/m³) per volume. The solid phase refers to an electron conduction portion, and, in the thermal battery 10, the solid phase refers to a portion other than the molten salt of the positive electrode material, a portion other than the molten salt of the negative electrode material, and all the electron conductors such as other connection members.

The diffusion equation is an equation representing diffusion of a charge carrier in an active material particle, and is expressed by the following formula:

$$\frac{\partial c_s}{\partial t} = \nabla \cdot (D_s \nabla c_s) \quad \text{[Mathematical formula 4]}$$

Here, $c_s$ represents charge carrier concentration (mol/m³) in the solid phase, t represents time (s), and $D_s$ represents a diffusion coefficient (m²/s) of a charge carrier in the solid phase. $D_s$ may be a function of charge carrier concentration in the electrode, an electrode composition, a state of charge (SOC), or a temperature. The SOC is a charging depth and represents a fully charged state by 1.0 and a fully discharged state by 0.0.

The Butler-Volmer equation is an equation representing an activation overvoltage in a charge transfer reaction occurring at an interface between the solid phase and the liquid phase, and the Nernst equation is a definition equation of equilibrium potential $E_{eq}$ and is expressed by the following formula:

$$i_{loc} = i_0 \left[ \exp\left(\frac{\alpha_a n F \eta}{RT}\right) - \exp\left(-\frac{\alpha_c n F \eta}{RT}\right) \right] \quad \text{[Mathematical formula 5]}$$

$$\eta = \phi_s - \phi_l - E_{eq}$$

$$E_{eq} = E_0 + \frac{nF}{RT} \ln\left(\frac{a_O}{a_R}\right)$$

Here, $i_{loc}$ is reaction current density (A/m²), $i_0$ is exchange current density (A/m²), $\alpha_a$ and $\alpha_c$ are transition coefficients, $\eta$ is an activation overvoltage (V), $E_{eq}$ is equilibrium potential (V), $E_0$ is standard equilibrium potential (V), n is the number of involved electrons, $a_O$ is oxidizing agent concentration, and $a_R$ is reducing agent concentration (mol/m³).

A relational expression between the charge carrier concentration in the solid phase and a charge carrier flux related to a charge transfer reaction on the surface of the active material particle is shown in Mathematical formula 6. $r_0$ represents a radius (m) of the active material particle, and $J_s$ represents a flux (mol/m²s) of the charge carrier. In other words, $J_s$ is an amount of charge carriers per unit area and unit time that disappear and are generated by a charge transfer reaction.

$$D_s \frac{\partial c_s}{\partial r} \bigg|_{r=r_0} = J_s \quad \text{[Mathematical formula 6]}$$

Mathematical formula 7 is an equation representing a relationship between the flux $J_s$ of the charge carrier and the reaction current density $i_{loc}$.

$$i_{loc} = zFJ_s \quad \text{[Mathematical formula 7]}$$

Mathematical formula 8 is an equation representing a relationship between the reaction current density $i_{loc}$ and the reaction current density $i_{tot}$ per volume. $S_v$ is a specific surface area per unit volume (m²/m³). $S_v$ may be a function of the radius $r_0$ of the active material particle.

$$i_{tot} = S_v i_{loc} \quad \text{[Mathematical formula 8]}$$

Figure 8:
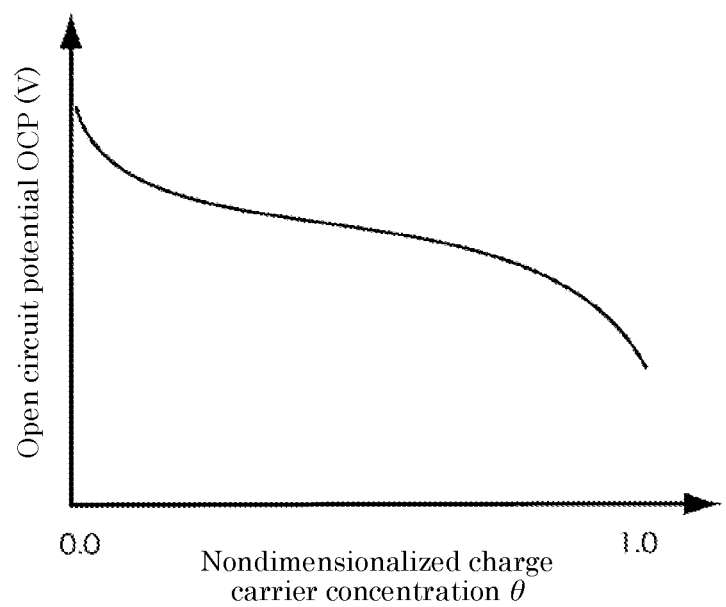
FIG. 8 is a graph showing a relationship between charge carrier concentration in a solid phase and open circuit potential (OCP) in a typical positive electrode material.

FIG. 8 is a graph showing a relationship between charge carrier concentration in a solid phase and open circuit potential (OCP) in a typical positive electrode material. $\theta$ is a dimensionless number defined by Mathematical formula 8 and is a function of the charge carrier concentration $c_s$. $c_{smax}$ is charge carrier concentration (mol/m³) in the solid phase at the end of discharge (=at the time of lower limit voltage) at the time of manufacturing the battery, that is, at the time when the battery is not deteriorated at all (that is, a 0th cycle). In contrast, $c_{smin}$ is charge carrier concentration (mol/m³) in the solid phase at an initial stage of discharge (=at the time of upper limit voltage=at the time of full charge) at the time of manufacturing the battery, that is, at the time when the battery is not deteriorated at all (that is, the 0th cycle). Since $c_s = c_{smin}$ is satisfied at the time of full charge, $\theta = 0.0$, and $c_s = c_{sax}$ is satisfied at the end of discharge, $\theta = 1.0$, $\theta$ changes from 0.0 to 1.0 on average as the battery is discharged. As described above, the open circuit potential OCP of the positive electrode is expressed as a function of the positive electrode $\theta$. In the same way, the open circuit potential OCP of the negative electrode is also expressed as a function of the negative electrode $\theta$. In the negative electrode, it is noted that $\theta = 1.0$ at the initial stage of discharge and $\theta = 0.0$ at the end of discharge.

The above is general description of the Newman model. However, for example, if the transport number $t_+$ of cation (positive ion)≈1.0, the second term on the right side of the first formula of Mathematical formula 2 can be ignored. In this case, current in the liquid phase will be calculated by Ohm's law. Since a term having strong nonlinearity can be ignored, calculation stability can be improved while a calculation load is reduced.

The Butler-Volmer equation is used as an equation representing the activation overvoltage in the charge transfer reaction. However, the Tafel equation may be alternatively used. Furthermore, it may be given in the form of optional table data. The exchange current density may be a function of charge carrier concentration in the electrode, an electrode composition, SOC, or a temperature. The diffusion equation of the charge carrier in the solid phase described in Mathematical formula 4 may be omitted in a case where the influence of the concentration overvoltage is negligible or in a case where it is desired to reduce the calculation load.

In the present embodiment, the Newman model is shown as an example of the model representing a physical phenomenon of the thermal battery 10. Alternatively, the Nernst equation often uses actual measurement data.

Alternatively, a single particle model in which the electrode is represented by a single active material particle may be used. For the single particle model, for example, a model disclosed in Non-Patent Document "Single-Particle Model for a Lithium-Ion Cell: Thermal Behavior, Meng Guo, Godfrey Sikha, and Ralph E. White, Journal of The Electrochemical Society, 158 (2) 122-132 (2011)" is preferably referred to.

Alternatively, a polynomial model in which the open circuit voltage OCV and internal resistance are expressed by a power function of a temperature and SOC may be used. For the polynomial model, for example, a model disclosed in Non-Patent Document "Modeling the Dependence of the Discharge Behavior of a Lithium-Ion Battery on the Environmental Temperature, Ui Seong Kim, a Jaeshin Yi, a Chee Burm Shin, Taeyoung Han, b and Seongyong Park, Journal of The Electrochemical Society, 158 (5) 611-618 (2011)" is preferably referred to.

Further alternatively, a model representing a characteristic of the thermal battery 10, such as an equivalent circuit model, may be used.

The molten salt of the thermal battery 10 is in a molten state in a case where the heat generation body 16 generates heat by combustion of the heat generation source 14, and exhibits excellent ion conductivity. At this time, current flows through the positive electrode layer 17a and the negative electrode layer 17c of the power generation cell 17. When current flows through the positive electrode layer 17a and the negative electrode layer 17c of the power generation cell 17, Joule heat is generated, so that the exothermic reaction further proceeds by an Arrhenius type reaction. When the temperature increases due to the progress of the exothermic reaction, the electric resistance decreases and the current further increases. As described above, the exothermic reaction and the Joule heat generation in the thermal battery 10 are not independent physical phenomena, but cause and effect of each other, and progress while being associated with each other through a physical phenomenon such as heat transfer, that is, while being coupled to each other.

In view of the above, the server device 100 according to the present embodiment performs analysis by coupling an exothermic reaction for increasing the temperature of the molten salt and Joule heat generation, and performs current calculation in consideration of, for example, a change in electric resistance due to the temperature increase.

For heat transfer, a solid heat conduction equation expressed by the following equation is used:

$$\rho C_p \frac{\partial T}{\partial t} = \nabla \cdot (k \nabla T) + Q \quad \text{[Mathematical formula 9]}$$

Here, $\rho$ is density (kg/m$^3$), $C_p$ is specific heat (J/kg/K), T is temperature (K), k is thermal conductivity (W/m/K), and Q is internal heat generation (W/m$^3$). Q represents combustion heat in the heat generation source 14, exothermic reaction heat and Joule heat generation in the heat generation body 16, and electrochemical reaction heat and Joule heat generation in the power generation cell 17, and further includes latent heat at the time of melting in the molten salt of the electrolyte layer 17b. In order to reduce the calculation load, a cause of heat generation considered to have a small influence may be appropriately ignored.

Heat transfer and heat radiation are preferably considered for heat dissipation to the outside. Heat transfer is a phenomenon in which heat is transported by flow of fluid, and radiation is a phenomenon in which heat is transported by an electromagnetic wave. The heat transfer is expressed by Mathematical formula 10 and the thermal radiation is expressed by Mathematical formula 11. Here, $q_{conv}$ is a heat transfer flux (W/m$^2$), h is a heat transfer coefficient (W/m$^2$s), T is an outer surface temperature (K) of the thermal battery 10 calculated in the course of simulation, $T_0$ is an outside air temperature (K), $q_{rad}$ is a thermal radiation flux (W/m$^2$), $\epsilon$ is a black body ratio, and G is a Stefan-Boltzmann constant (W/m$^2$/T$^4$).

$$q_{conv} = h(T - T_0) \quad \text{[Mathematical formula 10]}$$

$$q_{rad} = \epsilon \sigma (T^4 - T_0^4) \quad \text{[Mathematical formula 11]}$$

Alternatively, a thermal fluid simulation program considering flow of fluid (mainly air) around the thermal battery may be added to the present simulation program. This enables heat exchange between the thermal battery and the fluid around the thermal battery to be considered.

Further alternatively, calculation of thermal radiation may also include an object around the thermal battery in the simulation model without depending on Mathematical formula 11, and thermal radiation simulation using a shape factor may be performed.

A person performing the simulation preferably appropriately sets an initial temperature. This is because molten salt ion conductivity and stability of the material greatly change depending on a temperature.

For each layer of the thermal battery 10, a harmonic mean may be used for the thermal conductivity in the thickness direction, and an arithmetic mean may be used for other physical property values (thermal conductivity, specific heat, and density in the radial direction). For example, when the thermal conductivity in the thickness direction of each layer is $k_i$, the thickness of each layer is $t_i$, and a physical property value of each layer is $f_i$, the harmonic mean of the thermal conductivity in the thickness direction may be represented by Mathematical formula 12, and a calculated average of other physical property values may be represented by Mathematical formula 13. By using an equivalent physical property value of a composite material in this manner, the number of calculation elements can be reduced and the calculation load can be reduced.

$$k_t = \frac{\sum t_i}{\sum \left(\frac{t_i}{k_i}\right)} \quad \text{[Mathematical formula 12]}$$

$$\phi_{ave} = \frac{\sum (\phi_i t_i)}{\sum t_i} \quad \text{[Mathematical formula 13]}$$

The coupled calculation has an aspect of strong nonlinearity and difficulty in convergence of the calculation. In view of the above, the server device 100 may calculate current distribution in each layer using orthogonal mesh that intersects the axial direction (laminating direction) along the central axis P and the radial direction. The server device 100 can stabilize the calculation by using such orthogonal mesh.

As the shape of the simulation, a two-dimensional axisymmetric model is often used since a typical shape of the thermal battery illustrated in FIG. 5 is a cylindrical shape. However, a one-dimensional, two-dimensional, or three-dimensional shape may be used depending on the shape.

Hereinafter, operation of the server device 100 and the client device 200 will be described. In the present embodiment, simulation of the thermal battery 10 is executed as the server device 100 is accessed from the client device 200.

Figure 9:
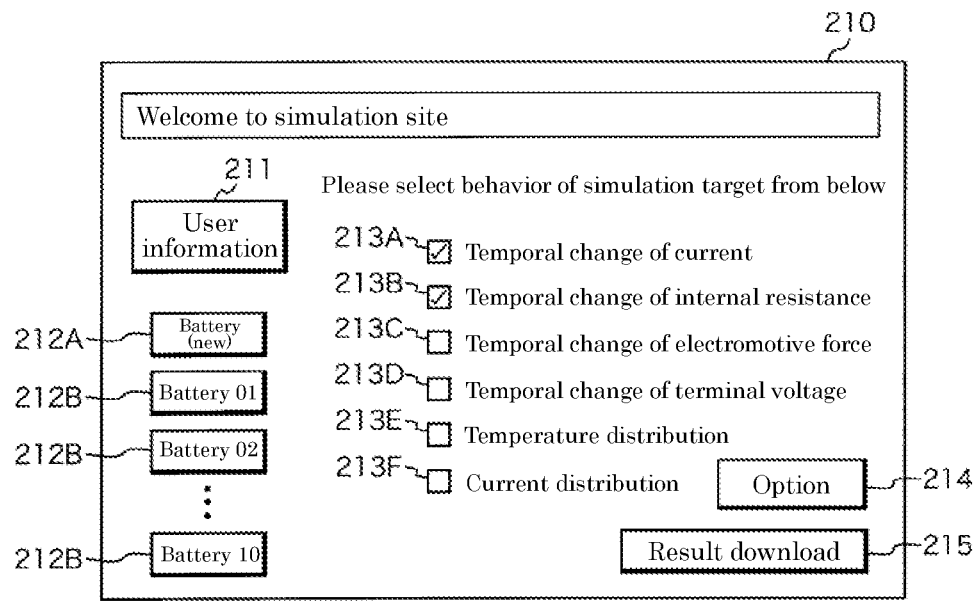
FIG. 9 is a schematic diagram illustrating an example of a user interface screen displayed on the client device.

FIG. 9 is a schematic diagram illustrating an example of a user interface screen displayed on the client device 200. A user interface screen 210 illustrated in FIG. 9 illustrates an example of a screen displayed on the display unit 205 of the client device 200 after the client device 200 accesses the server device 100 and is authenticated as a valid user. The client device 200 communicates with the server device 100 and acquires data for a display screen from the server device 100, so as to display the user interface screen 210 as illustrated in FIG. 9 on the display unit 205. The user authentication is not essential, and the server device 100 may be freely accessible. Alternatively, the authentication may be performed on a company, an association, a region, or a national basis.

The user interface screen 210 is a screen including an operation button, a check box, and the like arranged as components of the user interface, and receives operation by the user through the operation unit 204.

A display field 211 is a display field for displaying user information such as a user ID and date and time of a previous access. The client device 200 communicates with the server device 100 and acquires the user information such as a user ID and date and time of a previous access from the server device 100, so as to display the user information in the display field 211.

A registration button 212A is an operation button for registering information (battery information) on a new power storage device in the server device 100. In a case where the registration button 212A is operated using the operation unit 204, the client device 200 displays a reception screen for receiving the battery information on the display unit 205. In a case where the receiving of the battery information is completed, the client device 200 transmits the received battery information to the server device 100. The server device 100 registers the battery information received from the client device 200 in the battery table of the storage unit 102.

A selection button 212B is an operation button for acquiring detailed information of the thermal battery 10, and is individually prepared according to a type and specifications of the thermal battery 10. When any of the selection buttons 212B is operated using the operation unit 204, the client device 200 acquires detailed information of the selected thermal battery 10 from the server device 100. The acquired detailed information may be displayed on the display unit 205.

Check boxes 213A to 213F are boxes for selecting behavior of the simulation target. The check box 213A is labeled "temporal change of current". That is, the check box 213A indicates that the behavior of the simulation target in a case of being selected using the operation unit 204 is "temporal change of current". The same applies to the check boxes 213B to 213F. The behavior of the simulation target in a case where the check boxes 213B to 213F are selected using the operation unit 204 is indicated as "temporal change of internal resistance", "temporal change of electromotive force", "temporal change of terminal voltage", "temperature distribution", and "current distribution".

An option button 214 is an operation button for selecting a calculation option. In a case where the option button 214 is operated, on/off of an option used for simulation calculation is received. The calculation options include, for example, an option of calculating the whole by using the representative power generation cell 17, an option of calculating a current direction only in the thickness direction, an option of designating an energization start condition, an option of designating external circuit information, and the like. These options are described in second to fifth embodiments.

A download button 215 is an operation button operated when a simulation result is downloaded from the server device 100. The simulation result that can be downloaded in a case where the download button 215 is operated is data such as numerical data and a graph obtained as an execution result when the server device 100 executes simulation for behavior selected by the check boxes 213A to 213F. In a case where the download button 215 is operated using the operation unit 204, the client device 200 requests the server device 100 to transmit a simulation result through the communication unit 203, and receives the simulation result transmitted from the server device 100 as a response.

The server device 100 according to the present embodiment is configured to transmit data such as numerical data and a graph as a simulation result to the client device 200. Alternatively, server device 100 may transmit, to client device 200, a mathematical model in which a characteristic of the thermal battery 10 is mathematically described using an algebraic equation, a differential equation, and a characteristic parameter. The mathematical model is not merely a theoretical model, but represents a model after simulation is executed on the selected thermal battery 10 and various parameters are adjusted. In the present embodiment, the mathematical model is provided by, for example, a format of a library, a module, or the like used in numerical analysis software or a programming language such as MATLAB (registered trademark), Amesim (registered trademark), Twin Builder (registered trademark), MATLAB & Simulink (registered trademark), Simplorer (registered trademark), ANSYS (registered trademark), Abaqus (registered trademark), Modelica (registered trademark), VHDL-AMS (registered trademark), C language, C++, or Java (registered trademark).

Figure 10:
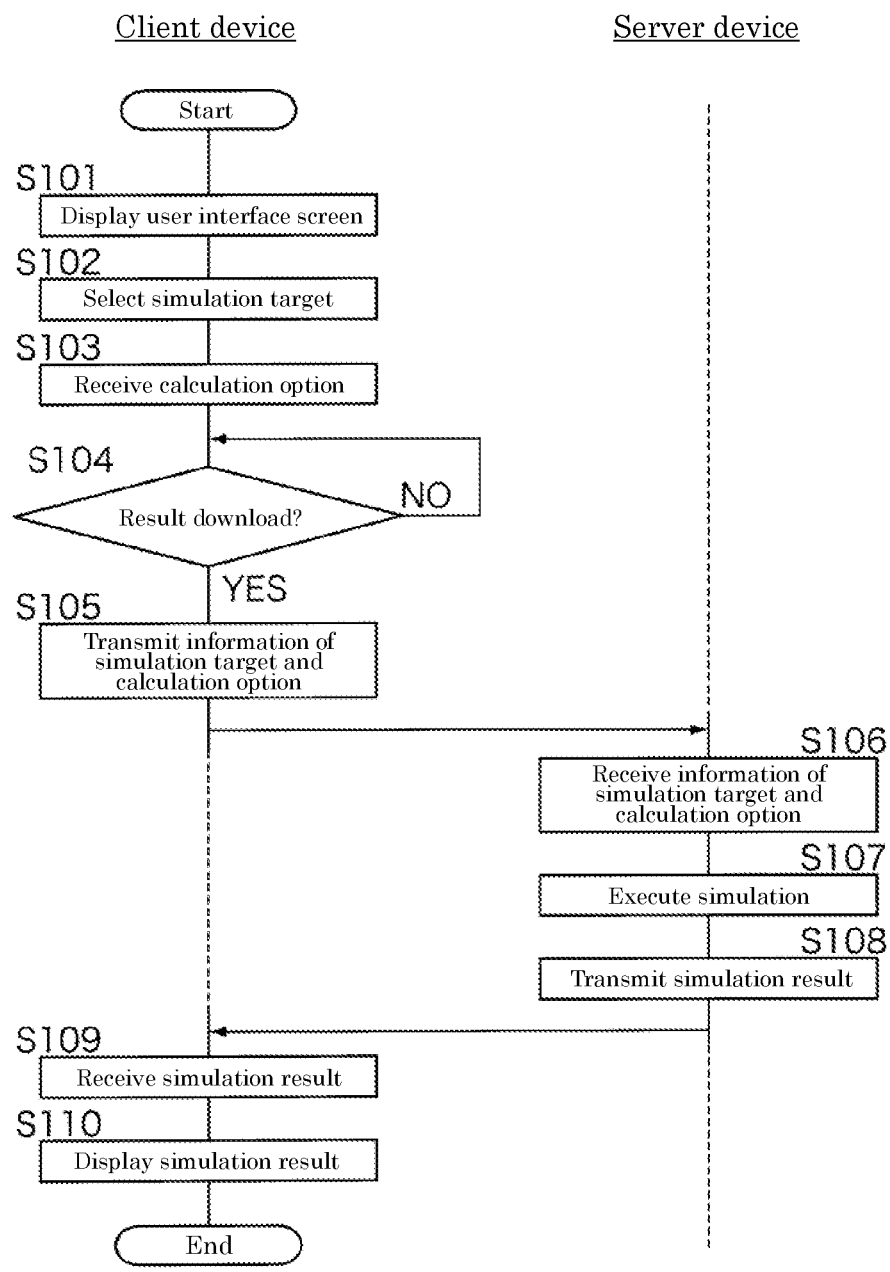
FIG. 10 is a flowchart describing a procedure of processing executed by the server device and the client device.

FIG. 10 is a flowchart describing a procedure of processing executed by the server device 100 and the client device 200. The control unit 201 of the client device 200 receives data for a display screen transmitted from the server device 100 after the user authentication, and displays the user interface screen 210 for selecting a simulation target on the display unit 205 (Step S101). The control unit 201 receives the selection of the simulation target through the user interface screen 210 displayed on the display unit 205 (Step S102). Specifically, the control unit 201 receives the selection of a type of the thermal battery 10 using the selection button 212B and the selection of the behavior of the simulation target using the check boxes 213A to 213F.

In a case where the option button 214 of the user interface screen 210 is operated, the control unit 201 displays a reception screen (not illustrated) for receiving a calculation option on the display unit 205, and receives a calculation option (Step S103).

Next, the control unit 201 determines whether or not a request for result download is received (Step S104). For example, in a case where the download button 215 is operated on the user interface screen 210 illustrated in FIG. 9, the control unit 201 determines that the request for result download is received. When it is determined that the request is not received (S104: NO), the control unit 201 waits until the request for result download is received. Alternatively, the configuration may be such that the request for result download is received after calculation.

In a case where the request for result download is received (S104: YES), the control unit 201 transmits the information on the simulation target selected in Step S102 and the information on the calculation option received in Step S103 to the server device 100 through the communication unit 203 (Step S105), and requests download of a simulation result. In a case where the calculation option is not received in Step S103, the control unit 201 may transmit information of a default calculation option to the server device 100.

In the server device 100, the communication unit 103 receives the information on the simulation target and the calculation option transmitted from the client device 200 (Step S106). The control unit 101 of the server device 100 executes simulation on the basis of the information on the simulation target and the calculation option received through the communication unit 103 (Step S107). At this time, the control unit 101 simulates behavior of the thermal battery 10 by executing a simulation program corresponding to behavior of the simulation target. The calculation option selected by the user is applied when a simulation program is executed.

In the thermal battery 10, the heat generation body 16 starts to generate heat by combustion of the heat generation source 14, and when the melting point is eventually exceeded, the molten salt becomes in a molten state, and current flows through the positive electrode layer 17a and the negative electrode layer 17c of the power generation cell 17. The control unit 101 couples the exothermic reaction and the Joule heat reaction, calculates the reaction rate r in the exothermic reaction by the Arrhenius reaction formula shown in Mathematical formula 1, and calculates the electromotive force and the internal resistance of the thermal battery 10 by, for example, the Newman model. The electromotive force of the thermal battery 10 is a value obtained by adding the equilibrium potential $E_{eq}$ of each electrode for the entire battery, and is a voltage between the positive and negative output terminals 13 at the time of no load.

Figure 11:
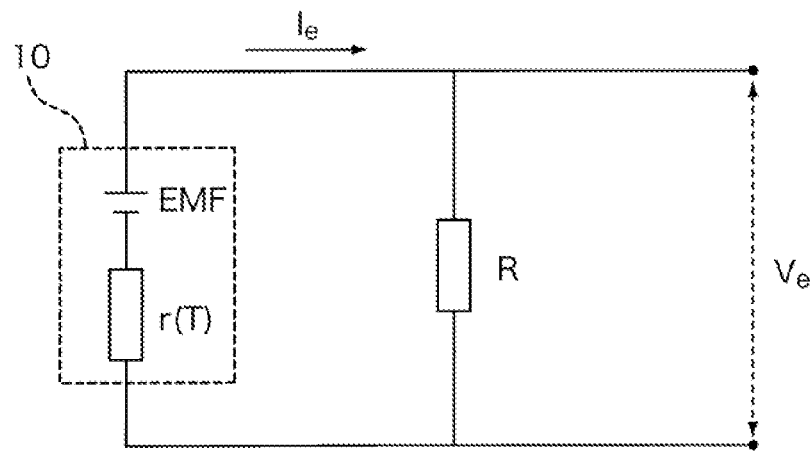
FIG. 11 is a circuit diagram of a submodel.

The control unit 101 may execute current calculation using a submodel that repeats a procedure of calculating the electromotive force of the thermal battery 10, a procedure of calculating the internal resistance of the thermal battery 10, and a procedure of calculating a current value in a next calculation step using external load resistance, the electromotive force, and the internal resistance of the thermal battery 10. A circuit diagram of the submodel is illustrated in FIG. 11. For example, in a case where the electromotive force of the thermal battery 10 is EMF, the internal resistance of the thermal battery 10 at a battery temperature T is r(T), the external load resistance is R, voltage between the terminals of the thermal battery 10 is $V_e$, and current of the thermal battery 10 is $I_e$, there are relations of Mathematical formula 14 and Mathematical formula 15. Accordingly, the control unit 101 can calculate the current $I_e$ from Mathematical formula 16, which is used as a boundary condition in a next calculation step.

$$V_e = RI_e \quad \text{[Mathematical formula 14]}$$

$$V_e = EMF - r(T)I_e \quad \text{[Mathematical formula 15]}$$

$$I_e = \frac{EMF}{r(T) + R} \quad \text{[Mathematical formula 16]}$$

The external load resistance of the thermal battery 10 is not necessarily a resistor, and may include other circuit elements such as a capacitor and an inductor. A value of the external load resistance may represent a characteristic of actual load, or a virtual value may be used.

The current $I_e$ described here can also be considered to be a maximum value of current that can be discharged from the thermal battery 10. Therefore, alternatively, an optional value of 0.0 (A) or more and less than $I_e$ may be set as the current flowing through the thermal battery 10 and used as a boundary condition in a next calculation step.

When the simulation is completed, the control unit 101 transmits a simulation result to the client device 200 through the communication unit 103 (Step S108). The simulation result transmitted in Step S108 may be numerical data, or a graph, a contour diagram, a moving image, or the like generated from the numerical data. The simulation result may be a mathematical model representing a characteristic of the thermal battery 10.

The client device 200 receives the simulation result transmitted from the server device 100 by the communication unit 203 (Step S109). The control unit 201 of the client device 200 causes the display unit 205 to display the received simulation result (Step S110).

Figure 12:
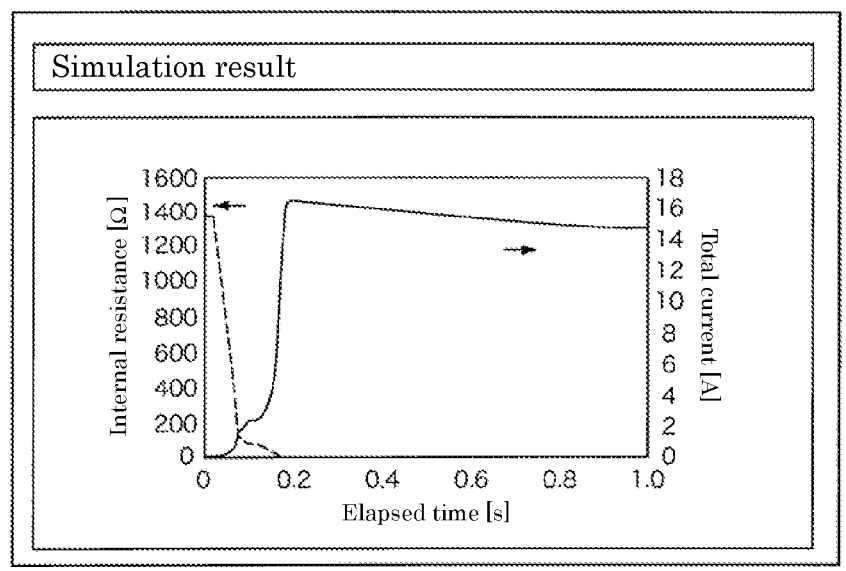
FIG. 12 is a schematic diagram illustrating a display example of a simulation result.

FIG. 12 is a schematic diagram illustrating a display example of a simulation result. FIG. 12 shows a simulation result relating to a temporal change in current and internal resistance of the thermal battery 10. That is, FIG. 12 shows a simulation result in a case where both the check boxes 213A and 213B are selected on the user interface screen 210. The simulation result is represented by, for example, a graph in which elapsed time (s) after the heat generation source 14 is ignited is taken on the horizontal axis, and internal resistance (O) and total current (A) are taken on the vertical axis. The example of FIG. 12 shows that the internal resistance decreases in about 0.1 seconds after the heat generation source 14 is ignited, and the current starts to flow.

The same applies to a case where the check box 213C or 213D is selected on the user interface screen 210, and a graph in which the elapsed time (s) after the heat generation source 14 is ignited is taken on the horizontal axis and an electromotive force (V) or terminal voltage (V) is taken on the vertical axis is displayed as a simulation result on the display unit 205 of the client device 200. In a case where the check box 213E or 213F is selected, a contour diagram of a temperature (temperature distribution) or magnitude of current density (current density distribution) at each position inside the thermal battery 10 is displayed on the display unit 205 of the client device 200.

As described above, in the present embodiment, the server device 100 can simulate behavior of the thermal battery 10 in consideration of the exothermic reaction for increasing the temperature of the molten salt of thermal battery 10 and Joule heating. Even in a case where the user is not familiar with a physical phenomenon in the thermal battery 10, the user can acquire a detailed simulation result of the thermal battery 10 by selecting a type of the thermal battery and behavior of a simulation target from the client device 200.

Second Embodiment

In the second embodiment, a calculation option of calculating the whole by using the representative power generation cell 17 will be described.

Figure 13:
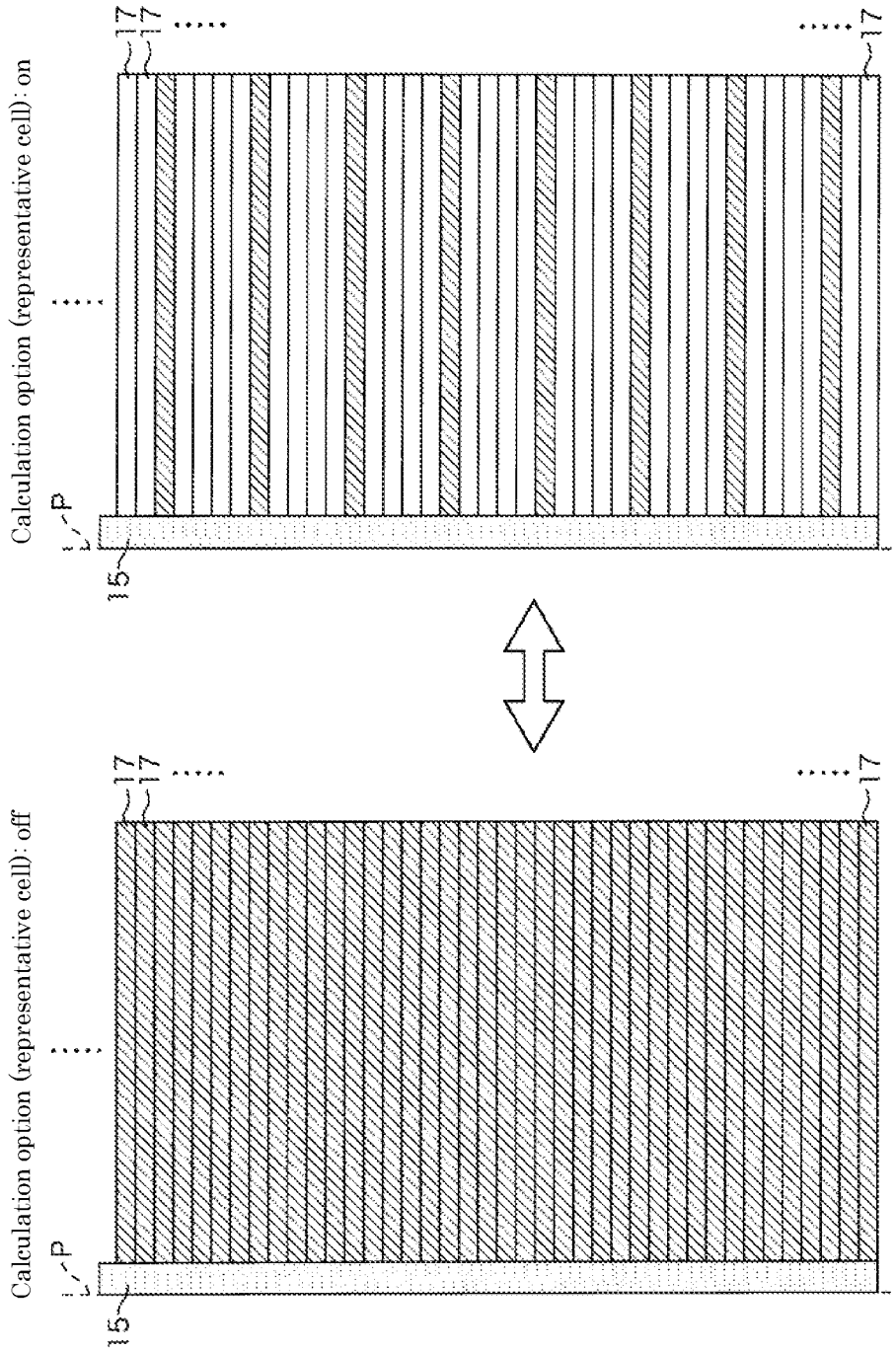
FIG. 13 is an explanatory diagram for describing a calculation option in a second embodiment.

FIG. 13 is an explanatory diagram for describing a calculation option in the second embodiment. As described above, the thermal battery 10 includes a plurality of the power generation cells 17. Typically, the thermal battery 10 includes about fifty to one hundred layers of the power generation cells 17. In a case where current is calculated in all these layers, there is a problem that calculation load increases. In view of the above, the server device 100 prepares an option of calculating the whole using the representative power generation cell 17 as a calculation option, and calculates current (electrochemistry) using the representative power generation cell 17 in a case where the user turns on this calculation option. In the example of FIG. 13, the configuration of the thermal battery 10 is simplified, and the power generation cell 17 as a calculation target is indicated by hatching.

The representative power generation cell 17 is set in advance in the server device 100. Alternatively, the representative power generation cell 17 is selected by the user. For example, when one of five successive layers of the power generation cells 17 is set as the representative power generation cell 17, electrochemical calculation load is reduced to about ⅕.

Third Embodiment

In the third embodiment, a calculation option for performing calculation while limiting the direction of current to only the thickness direction will be described.

Figure 14:
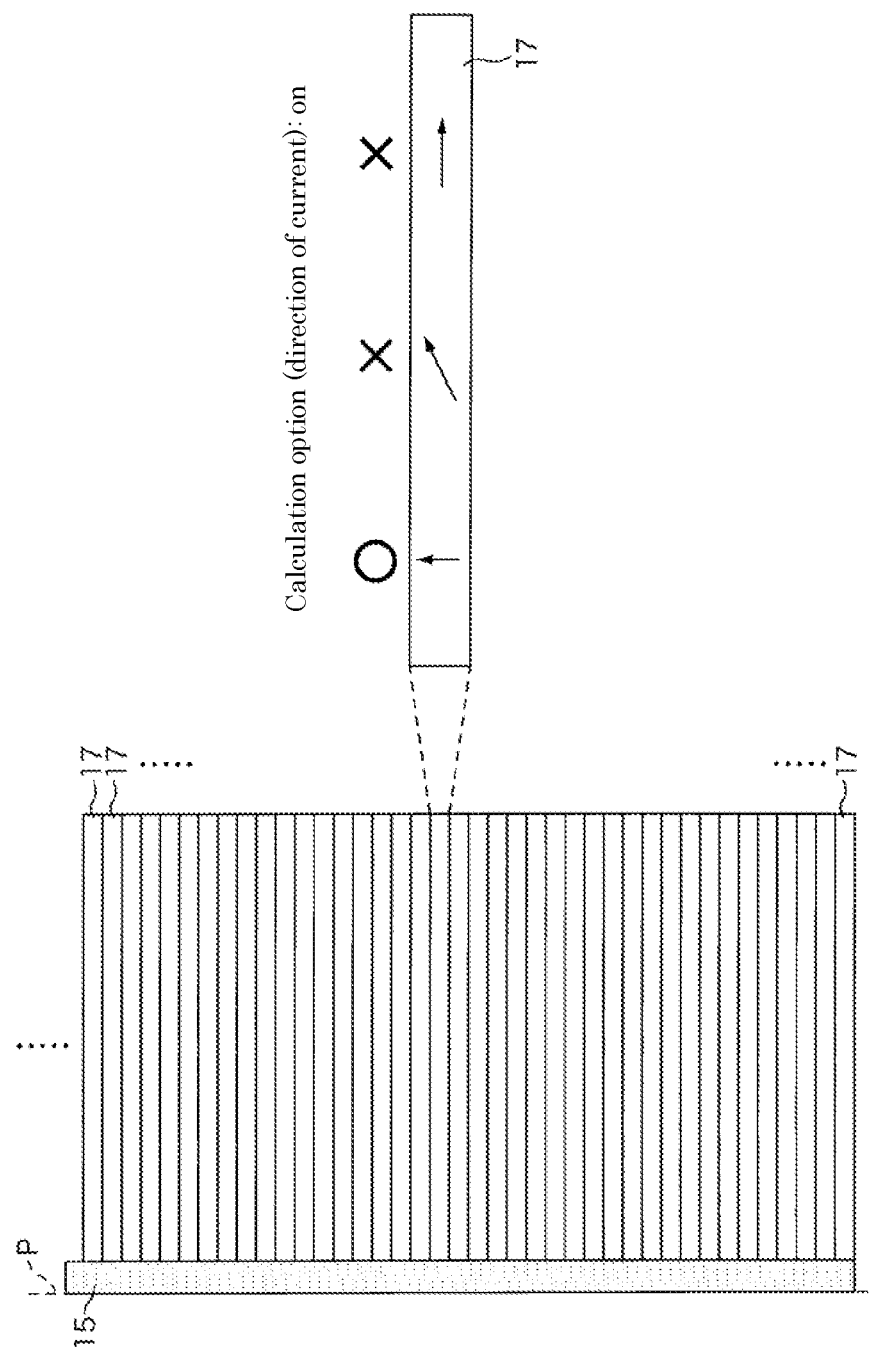
FIG. 14 is an explanatory diagram for describing a calculation option in a third embodiment.

FIG. 14 is an explanatory diagram for describing a calculation option in the third embodiment. Since each layer of the thermal battery 10 is small in thickness than in the radial direction, it is expected that the direction of a current density vector substantially coincides with the thickness direction. For this reason, the server device 100 prepares, as a calculation option, an option of performing calculation by limiting the direction of current only to the thickness direction, and in a case where the user turns on this calculation option, current flowing in the radial direction is ignored and current calculation is performed using only current flowing in the thickness direction.

The server device 100 according to the third embodiment can reduce the number of dimensions for current calculation to one dimension, and can reduce calculation load.

Fourth Embodiment

The method for determining the current boundary condition using the submodel has been described so far. Alternatively, the boundary condition of the thermal battery model may be determined with reference to a value of the submodel.

Figure 15:
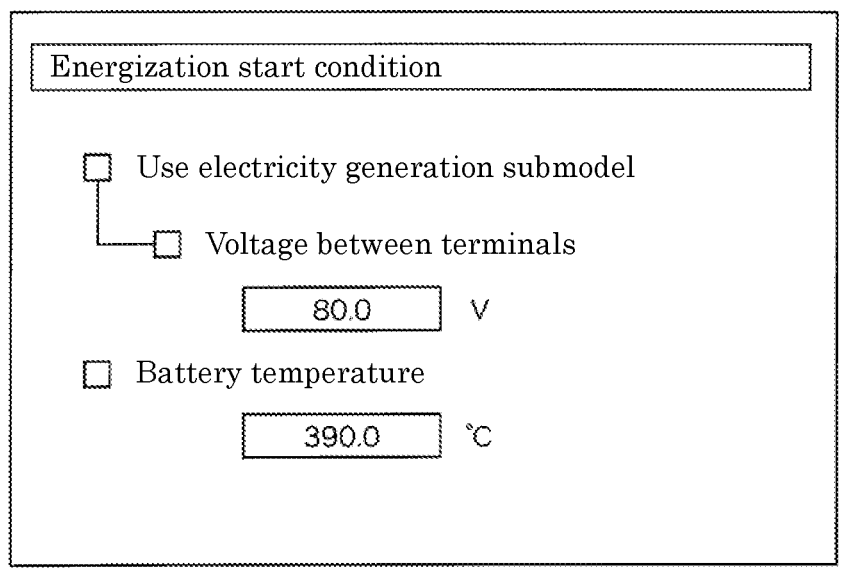
FIG. 15 is an input screen for an energization start condition in a fourth embodiment.

For example, in a case where the value R of the external load resistance is extremely large in the submodel of FIG. 11, a voltage drop at the external load resistance becomes the voltage between the terminals of the thermal battery 10 in an open state. The term "extremely large" as used here means that the value is sufficiently larger than (for example, as 100 times large as) the internal resistance during melting of the molten salt of the thermal battery 10. In other words, at this time, the external load resistance is a voltmeter of the thermal battery 10. FIG. 15 is an input screen for an energization start condition in the fourth embodiment. As illustrated in FIG. 15, the energization may be started in a case where the voltage between the terminals of the thermal battery 10 exceeds a predetermined value.

Alternatively, the energization may be started when the temperature of the thermal battery 10 exceeds a predetermined temperature. Regardless of which method is used, it is necessary to take care that the voltage between the terminals of the thermal battery 10 does not become negative, and therefore caution is required in calculation.

Fifth Embodiment

Although the simulation of the portion of the thermal battery 10 has been described so far, in the fifth embodiment, a case where a circuit (an electric circuit or a thermal circuit to be described later) connected to the thermal battery 10 is included in the simulation will be described.

The simulation program provided by the server device 100 may include not only the thermal battery 10 but also an electric circuit connected to the thermal battery 10. The client user may perform electric circuit simulation including the thermal battery 10 on the server device 100.

The electric circuit may include, in addition to an ohmic resistor, a capacitor, an inductor, a diode, a semiconductor element (thyristor, IGBT, MOSFET, or the like), and the like.

The boundary condition applied to the thermal battery 10 is not necessarily applied by a passive element, and may include a constant current condition, a constant voltage condition, a constant power condition, and the like. The value may vary with time, or the boundary condition may change (for example, the constant current boundary condition is changed to the constant power boundary condition) in the course of discharge.

The electric circuit may include a control circuit that performs switching operation, load switching, constant value control, target value control, and the like.

The circuit connected to the thermal battery 10 may include a thermal circuit. In the thermal circuit, heat capacity and thermal resistance are expressed by a differential equation similar to that of the electric circuit. Temperature behavior of the system is calculated like circuit simulation.

The thermal circuit may include a heat source other than the thermal battery 10, heat capacity, thermal resistance, a heat dissipation boundary, and a constant temperature boundary. Values of a heat source, heat capacity, thermal resistance, and the like may vary with time, or the boundary condition may change in the course of discharge.

Figure 16:
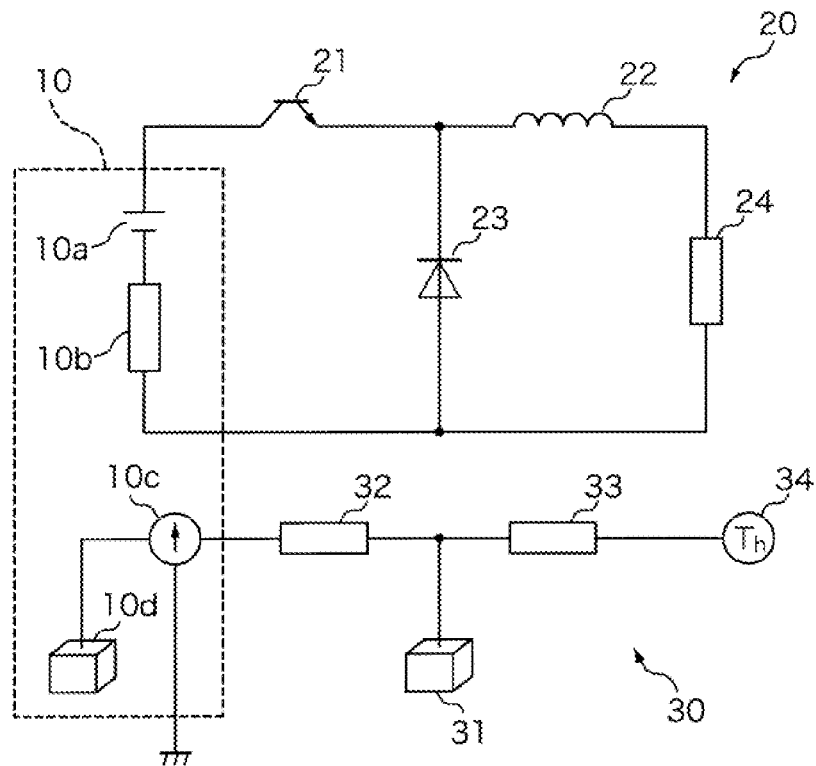
FIG. 16 is a circuit diagram illustrating an example of circuit simulation including a thermal battery, an electric circuit, and a thermal circuit.

FIG. 16 is a circuit diagram illustrating an example of circuit simulation including the thermal battery 10, an electric circuit 20, and a thermal circuit 30. In this circuit simulation, the thermal battery 10 is treated as a heat source and a current source (or a voltage source). The thermal battery 10 includes an electromotive unit 10a, internal resistance 10b, a heat source 10c, and heat capacity 10d. The electric circuit 20 includes, for example, a semiconductor element 21, an inductor 22, a diode 23, and load 24. The thermal circuit 30 includes, for example, heat capacity 31 of load, thermal resistance 32 between the thermal battery 10 and the load, thermal resistance 33 between the load and outside air, and an outside air temperature 34. As a matter of course, the circuit elements may be freely combined according to load and a use condition.

Sixth Embodiment

In a sixth embodiment, a configuration in which heat generation density in an exothermic reaction is provided as a function of a position and time will be described.

In the first embodiment, the exothermic reaction in the thermal battery 10 is expressed by the Arrhenius reaction formula. However, there is a problem that calculation load is large. In view of the above, the server device 100 according to the sixth embodiment acquires an experimental result or a simulation result of the heat generation density in advance, and provides the heat generation density as a function of a position and time, so that the calculation of a temporal transition of the exothermic reaction.

For example, (1) in a case where heat generation time of the heat generation source 14 or the heat generation body 16 is sufficiently shorter than representative time of a discharge phenomenon, and (2) in a case where a temperature increasing process of the molten salt is not a main object of interest of the simulation, the method according to the sixth embodiment is useful.

Figure 17:
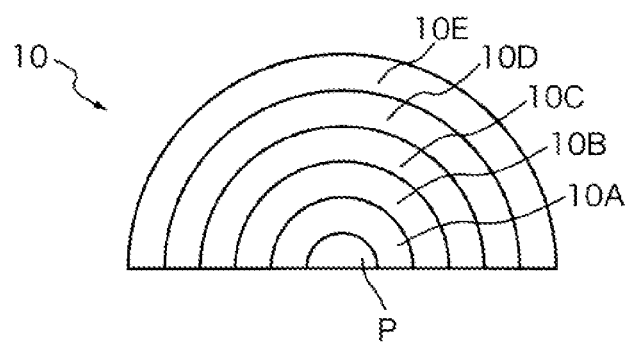
FIG. 17 is an explanatory view for describing how to provide heat generation density in a sixth embodiment.

FIG. 17 is an explanatory view for describing how to provide heat generation density in the sixth embodiment. FIG. 17 illustrates an example in which the thermal battery 10 is divided into five regions of regions 10A to 10E from the inner side (the center axis P side) toward the outer side, and time dependency of heat generation density is provided to each of the regions 10A to 10E. For example, the region 10A indicates that heat is generated in a time zone of 0.03 to 0.31 sec from the start of ignition and heat generation density is H1 (W/m$^3$). The same applies to the regions 10B to 10E, indicating that the heat generation densities are H2 to H5 (W/m$^3$) in the time zones indicated by hatching, respectively.

As described above, in the six embodiment, the server device 100 can omit the calculation of a temporal transition of the exothermic reaction using the Arrhenius reaction formula by providing the heat generation density as a function of a position and time, so that the calculation load can be reduced.

Seventh Embodiment

In a seventh embodiment, an example of an effective display method of a simulation result will be described.

Since a temperature and current-voltage distribution are closely related in the thermal battery 10, a mutual relationship between these values is important information at a design and development site. However, there is strong nonlinearity in temperature dependency of the ionic conductivity of the molten salt, there is a case where steep temperature distribution appears in the radial direction of the thermal battery 10, and furthermore, if the thermal battery 10 is a bipolar battery and there is even one electrode with an insufficient electromotive force, there is possibility that the overall performance is greatly impaired. For this reason, a relationship between a temperature, current, and voltage is often not consistent with intuition, and it is often difficult to understand the phenomenon.

Figure 18:
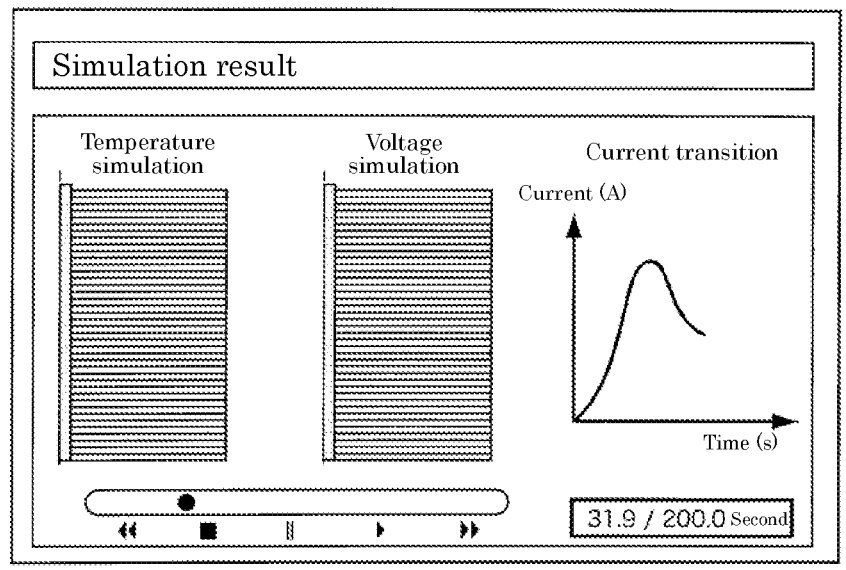
FIG. 18 is a schematic diagram illustrating an example of a result display screen in a seventh embodiment.

In view of the above, when a temperature, voltage, and current are displayed side by side on one screen, each physical quantity in the battery can be intuitively grasped and a complicated relationship between these physical quantities can be easily understood, which is advantageous. FIG. 18 is a schematic diagram illustrating an example of a result display screen in the seventh embodiment. Distribution of a temperature and voltage may be an animation of a contour diagram or may be updated in real time as the simulation progresses. Although the current is displayed as a graph in FIG. 18, the graph may be drawn in real time in accordance with the progress of the simulation. In addition to this, the voltage between the terminals may be displayed as a graph, or a vector diagram of current distribution may be superimposed on a contour diagram of voltage distribution. It is not necessary to display all the physical quantities described in this paragraph, and the configuration may be such that two or more physical quantities selected as appropriate are displayed.

Eighth Embodiment

In an eighth embodiment, another example of an effective display method of a simulation result will be described.

Since the thermal battery 10 is activated by melting the electrolyte, it goes without saying that the electrolyte is not melted and energization is not started with an excessively small amount of heat generation. However, when excessive heat generation is applied, the temperature is excessively increased, and there is a concern that a material constituting the power generation cell or the connection member is burned or a material decomposition reaction occurs. For this reason, a highest temperature reached by the temperature increase by the heat generation source 14 and the heat generation body 16 is required to be higher than the melting point of the molten salt and lower than a heat resistant temperature of each constituent element. This is generally a difficult problem.

Figure 19:
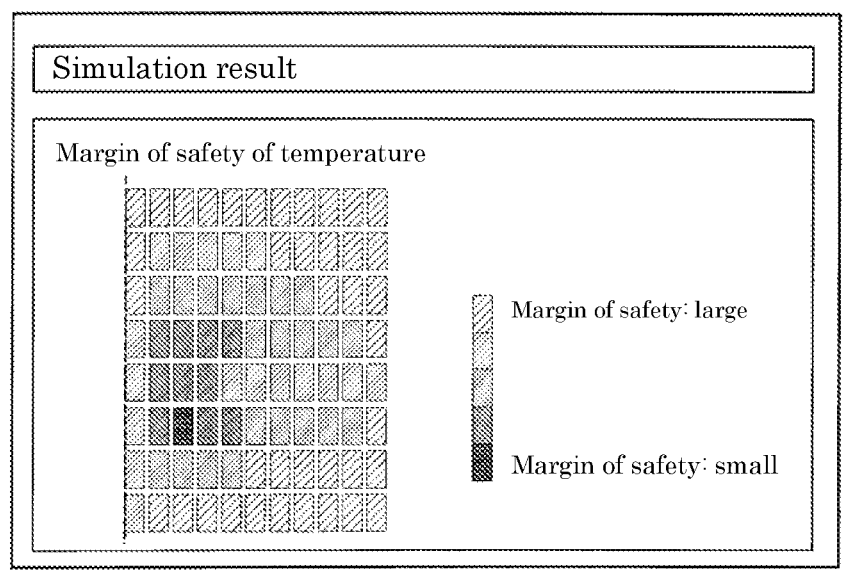
FIG. 19 is a schematic diagram illustrating an example of a result display screen in an eighth embodiment.

In view of the above, if the melting point or the heat resistant temperature is input in advance and a difference from a temperature obtained in the simulation process is displayed, the margin of safety of the designed temperature can be grasped. FIG. 19 is a schematic diagram illustrating an example of a result display screen in the eighth embodiment. For example, FIG. 19 is a contour diagram illustrating "(heat resistant temperature)−(simulation temperature)", in which a small value indicates that the temperature increases to near the heat resistant temperature, indicating that the safety margin of the designed temperature is small.

It is to be understood that the embodiments disclosed herein are illustrative in all respects and not restrictive. The scope of the present invention is defined not by the meanings described above but by the claims, and is intended to include meanings equivalent to the claims and all modifications within the scope.

For example, although the embodiment in which the simulation is performed by the communication between the server device 100 and the client device 200 is exemplified in the first embodiment, the embodiment may be such that a server administrator provides a thermal battery simulation program to the client user by means of a recording medium such as a DVD-ROM, and the simulation is performed locally in the client terminal. The means for providing the thermal battery simulation program may be in a download format via communication.

The simulation program provided to the client user may include not only the thermal battery portion and the circuit portion including the external load mainly described in the embodiment but also a digital control circuit that performs switching operation, load switching, and the like.

The simulation program provided to the client user may be completely hidden (that is, uneditable) by the intention of a provider of a development support device, or may be partially hidden so that only some parameters can be changed by the client user.

The client device 200 may be configured to be able to select a format of the simulation program to be downloaded for the server device 100 by numerical analysis software or a program language. In this manner, the client user can use the present simulation program by numerical analysis software or a programming language owned by the client user.

In the embodiment, only the discharge process is described with the thermal battery 10 as a primary battery. However, the battery may be a secondary battery as long as the battery has a characteristic that the molten salt is melted by temperature increase and energization is started. That is, the server device 100 (or the client device 200) may perform simulation including both a discharge process and a charge process. Also in a case where the discharge process is considered, it is only necessary to invert the sign of the current boundary condition using the calculation model described in the embodiment.

The invention claimed is:

1. A simulation method of a battery using molten salt as an electrolyte, the method comprising the steps of:
   simulating behavior of the battery by increasing a temperature of the molten salt, wherein:
      the battery comprises:
         a heat generation source,
         a heat generation body that starts to generate heat by combustion of the heat generation source, and
         a power generation cell formed by stacking a positive electrode layer, an electrolyte layer, and a negative electrode layer, and
      the battery is a bipolar type thermal battery in which the heat generation body and the power generation cell are stacked along a stacking direction of the positive electrode layer, the electrolyte layer, and the negative electrode layer; and
   calculating a calorific value in the exothermic reaction based on a packing amount and a temperature of the heat generation source.

2. The simulation method according to claim 1, wherein:
   ionic conductivity of the molten salt is a function of a temperature, and
   the ionic conductivity indicates a value of insulation at a temperature equal to or lower than a first threshold temperature and indicates a value of conductivity at a temperature equal to or higher than a second threshold temperature.

3. The simulation method according to claim 2, further comprising the step of simulating behavior of the battery based on an exothermic reaction for increasing a temperature of the molten salt.

4. The simulation method according to claim 3, further comprising the step of simulating behavior of the battery by a coupled analysis of the exothermic reaction and Joule heating.

5. The simulation method according to claim 1, further comprising the step of calculating heat transfer using an equivalent physical property value calculated from a physical property value of each layer.

6. The simulation method according to claim 1, further comprising the step of calculating current distribution of each layer using a selected part of layers as a representative layer.

7. The simulation method according to claim 1, further comprising the step of calculating current distribution of each layer using only a current component in the stacking direction.

8. The simulation method according to claim 1, further comprising the step of calculating current distribution of each layer using an element mesh-divided in the stacking direction and an intersecting direction intersecting the stacking direction.

9. The simulation method according to claim 1, further comprising the step of executing current calculation using a sub-model that repeats:
   a procedure of calculating an electromotive force of the battery,
   a procedure of calculating internal resistance of the battery, and
   a procedure of calculating a current value in a next calculation step based on external load resistance of the battery and calculated values of the electromotive force and the internal resistance.

10. The simulation method according to claim 1, further comprising the step of providing heat generation density in the exothermic reaction as a function of a position and time.

11. A simulation device comprising:
   a simulation execution unit that:
      simulates behavior of a battery using molten salt as an electrolyte, the behavior including a process of increasing a temperature of the molten salt, the battery comprising: a heat generation source, a heat generation body that starts to generate heat by combustion of the heat generation source, and a power generation cell formed by stacking a positive electrode layer, an electrolyte layer, and a negative electrode layer, wherein the battery is a bipolar type thermal battery in which the heat generation body and the power generation cell are stacked along a stacking direction of the positive electrode layer, the electrolyte layer, and the negative electrode layer; and
      calculates a calorific value in the exothermic reaction based on a packing amount and a temperature of the heat generation source; and
   an output unit that outputs a simulation result by the simulation execution unit.

12. The simulation device according to claim 11, wherein the simulation execution unit simulates at least one of an electric circuit and a thermal circuit connected to the battery.

13. The simulation device according to claim 11, wherein the simulation execution unit generates at least two graphs selected from the following: a temporal change of temperature distribution, voltage distribution, current density distribution, a current value, and voltage between terminals, and
   the output unit outputs data of the graph to a display device so as to display the generated two graphs on a same screen.

14. A computer program product comprising non-transitory computer-readable medium having stored thereon computer executable instructions for:
   simulating behavior of a battery using molten salt as an electrolyte, the behavior including a process of increasing a temperature of the molten salt, the battery comprising: a heat generation source, a heat generation body that starts to generate heat by combustion of the heat generation source, and a power generation cell formed by stacking a positive electrode layer, an electrolyte layer, and a negative electrode layer, wherein the battery is a bipolar type thermal battery in which the heat generation body and the power generation cell are stacked along a stacking direction of the positive electrode layer, the electrolyte layer, and the negative electrode layer; and
   calculating a calorific value in the exothermic reaction based on a packing amount and a temperature of the heat generation source.

15. The computer program according to claim 14, wherein the computer executable instructions are further configured for simulating at least one of an electric circuit and a thermal circuit connected to the battery.

16. The computer program according to claim 14, wherein the computer executable instructions are further configured for:
   generating at least two graphs selected from the following: a temporal change of temperature distribution, voltage distribution, current density distribution, a current value, and voltage between terminals, and outputting data of the graph to a display device so as to display the generated two graphs on a same screen.

\* \* \* \* \*